(12) United States Patent
Shi

(10) Patent No.: US 10,690,221 B2
(45) Date of Patent: Jun. 23, 2020

(54) CYLINDRICAL TRANSMISSION

(71) Applicant: BEIJING HUAQING RESEARCH INSTITUTE OF TRANSMISSION ENGINEERING AND TECHNOLOGY, Beijing (CN)

(72) Inventor: Mingzheng Shi, Beijing (CN)

(73) Assignees: SHENZHEN HUAQING TRANSMISSION TECHNOLOGY CO., LTD. (CN); SHENZHEN ZHITONGTIANXIA TECHNOLOGY SERVICE CO., LTD. (CN); BEIJING HUAQING RESEARCH INSTITUTE OF TRANSMISSION ENGINEERING AND TECHNOLOGY (CN)

( * ) Notice: Subject to any disclaimer, the term of this patent is extended or adjusted under 35 U.S.C. 154(b) by 326 days.

(21) Appl. No.: 15/545,226

(22) PCT Filed: Jan. 20, 2016

(86) PCT No.: PCT/CN2016/071441
§ 371 (c)(1),
(2) Date: Oct. 8, 2017

(87) PCT Pub. No.: WO2016/116042
PCT Pub. Date: Jul. 28, 2016

(65) Prior Publication Data
US 2019/0195317 A1    Jun. 27, 2019

(30) Foreign Application Priority Data
Jan. 20, 2015  (CN) .......................... 2015 1 0026334

(51) Int. Cl.
*F16H 3/04*    (2006.01)
*F16H 3/54*    (2006.01)
(Continued)

(52) U.S. Cl.
CPC ............... *F16H 3/04* (2013.01); *F16H 3/097* (2013.01); *F16H 3/10* (2013.01); *F16H 3/54* (2013.01);
(Continued)

(58) Field of Classification Search
CPC ....................................................... F16H 3/097
(Continued)

(56) References Cited

U.S. PATENT DOCUMENTS 3,927,580 A    12/1975  Lewmar

FOREIGN PATENT DOCUMENTS

CN    1369656    9/2002
CN    2921450    7/2007  ............... F16H 3/44
(Continued)

OTHER PUBLICATIONS

International Search Report for PCT International Patent Application Serial No. PCT/CN2016/071441; dated Apr. 11, 2016 (4 pages).
(Continued)

*Primary Examiner* — Derek D Knight
(74) *Attorney, Agent, or Firm* — Hayes Soloway P.C.

(57) ABSTRACT

A cylindrical transmission includes a housing, an input shaft and an output shaft. The housing includes several circular discs having outside lips, the input shaft and the output shaft being provided on centre lines of the circular discs. The driving gears are provided on the input shaft; and a rotary disc having internal teeth is provided on the output shaft. Several gear shafts are provided between two adjacent circular discs, the gear shafts are located on the outer peripheries of the driving gear between the two adjacent circular discs, several gears are provided on each gear shaft, the gear shaft is adjacent to the rotary disc, one of the several (Continued)

gears is separated from or engaged with the rotary disc internal teeth, and all the circular discs are connected to each other via the outside lips.

28 Claims, 35 Drawing Sheets

(51) Int. Cl.
*F16H 3/58* (2006.01)
*F16H 3/097* (2006.01)
*F16H 3/10* (2006.01)
*F16H 37/08* (2006.01)
*F16H 57/021* (2012.01)
*F16H 57/029* (2012.01)
*F16H 57/037* (2012.01)
*F16H 57/04* (2010.01)
*F16H 63/30* (2006.01)
*F16H 3/08* (2006.01)

(52) U.S. Cl.
CPC ........... *F16H 3/58* (2013.01); *F16H 37/0813* (2013.01); *F16H 57/021* (2013.01); *F16H 57/029* (2013.01); *F16H 57/037* (2013.01); *F16H 57/0471* (2013.01); *F16H 63/304* (2013.01); *F16H 2003/0822* (2013.01)

(58) Field of Classification Search
USPC ......................................................... 475/298
See application file for complete search history.

(56) References Cited

FOREIGN PATENT DOCUMENTS

| | | | | |
|---|---|---|---|---|
| CN | 101564993 | | 10/2009 | |
| CN | 202170969 | | 3/2012 | |
| CN | 202170969 U | * | 3/2012 | ............... F16H 3/04 |
| CN | 103335073 | | 10/2013 | ............... F16H 3/44 |
| JP | 2013108611 | | 6/2013 | |
| RU | 2017034 | | 7/1994 | |
| WO | WO 2009/062378 | | 5/2009 | ............... F16H 3/44 |
| WO | WO 2012/006933 | | 1/2012 | ............. F16H 29/02 |

OTHER PUBLICATIONS

Extended European Search Report issued in corresponding European Appln. Serial No. 16739789.2 dated Oct. 16, 2018 (12 pgs).

* cited by examiner

CYLINDRICAL TRANSMISSION

BACKGROUND OF THE INVENTION

The present invention relates to the technical field of mechanical transmission, in particular to a cylindrical transmission that is applicable to various moving vehicles or machineries to enable the moving vehicles or machineries to change torque during operation continuously.

BRIEF DISCUSSION OF THE PRIOR ART

At present, kinds of mechanical transmissions are multi-shaft transmissions, hydraulic transmissions, dual clutch transmissions and continuously variable transmissions. However, those transmissions have shortcomings including large volume, high costs and low speed difference. Especially, in the field of electric vehicles, there is no transmission with small volume and big speed difference which is fully suitable for electric vehicles.

SUMMARY OF THE INVENTION

To solve the problems of large volume, high costs, small speed difference and the like in existing mechanical transmissions, the present invention provides a cylindrical transmission, which comprises a housing, an input shaft, and an output shaft, wherein, the housing comprises several circular discs with outside lips provided thereon, the input shaft and the output shaft being provided on center lines of the several circular discs, several driving gears are provided on the input shaft, a rotary disc is provided on the output shaft, and the rotary disc is provided with rotary disc internal teeth; several gear shafts are provided between two adjacent circular discs, the gear shafts are located on the outer periphery of the driving gears between the two adjacent circular discs, and several gears are provided on each gear shaft; the gear is adjacent to the rotary disc, and one of the several gears is disengaged from or engaged with the rotary disc internal teeth; all the circular discs are connected with each other via the outside lips.

The cylindrical transmission provided in the present invention has advantages of a small volume, low costs, big speed difference and the like, can realize automatic and manual gear shift, can increase starting force, improve application performance, save energy and reduce consumption for various vehicles and machineries, and can be widely applied on various electric vehicles, fuel vehicles, new energy vehicles, power locomotives, ships and various machineries. The cylindrical transmission provided in the present invention enables an electric vehicle to shift gears successfully without clutch and uses constant limited current to continuously change the torque to make the vehicle travel normally, and thereby attain purposes of protecting electric motor, prolonging service life of battery and controller, reducing energy consumption and increasing continuation mileage of the electric car.

DESCRIPTION OF SYMBOLS

Figure 1:
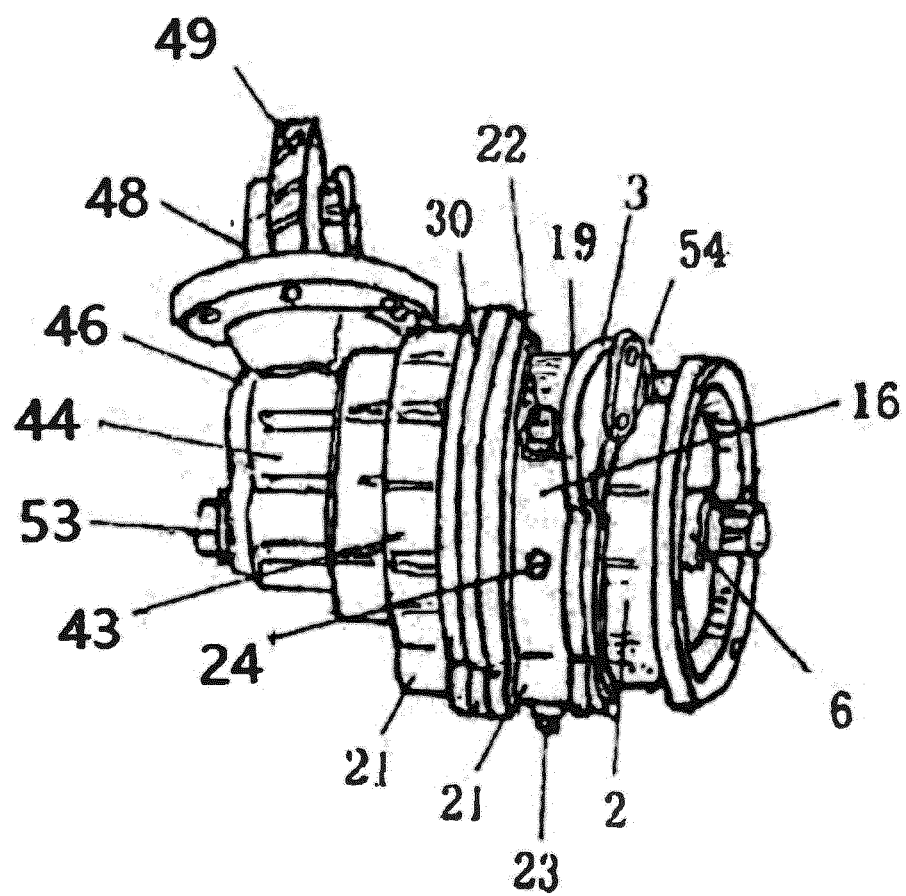
FIG. 1 is an outside view of the cylindrical transmission connected with a differential on an electric tricycle according to a first embodiment.

1—oil seal; 2—front end cover of transmission; 3—dome of front end cover; 4—circlip for hole; 5—bearing; 6—input shaft; 7—external spline; 8—key flat; 9—shift gear bushing; 10—gear press plate; 11—bevel; 12—duplex intermediate shift gear, 13—outer shift gear, 14—outer shift gear shaft; 15—spacing ring; 16—H-disc; 17—internal flat surface of H-disc; 18—center bole of transmission; 19—dome of H-disc; 20—solid lubricant embedded bearing; 21—oil pan; 22—oil charge valve; 23—oil drain valve; 24—oil level valve; 25—driving gear; 26—transmission gear upper wheel; 27—transmission gear bottom wheel; 28—circlip for shaft; 29—fixed disc; 30—fixed disc side opening; 31—leaf spring ring; 32—rotary disc; 33—internal teeth of rotary disc; 34—external teeth to be engaged; 35—overrunning clutch; 36—compression spring; 37—engagement disc; 38—internal teeth to be engaged; 39—pin shaft; 40—key; 41—output shaft; 42—output gear; 43—rear housing of transmission; 44—differential case; 45—inner side surface of differential; 46—outer side surface of differential; 47—idle gear hole of differential; 48—differential pack; 49—driven gear, 50—end cap of oil seal; 51—steel ball; 52—ejector pin; 53—self-retaining electromagnet; 54—gear pull plate; 55—motor, 56—motor shaft; 57—internal spline; 58—front end cover of motor, 59—screw rod; 60—sealing gasket; 61—transmission gear shaft; 62—internal flat surface of fixed disc; 63—stud; 64—idle gear, 65—idle gear shaft; 66—electromagnet push-pull rod; 67—positioning pin; 68—leaf spring; 69—lip; 70—transmission single gear; 71—nut; 72—rabbet; 73—shift intermediate gear shaft; 74—shift pull plate; 75—shift pull wire; 76—shifter case; 77—shift lever, 78—gear track groove; 79—ball screw; 80—plain washer; 81—electronic automatic controller; 82—dovetail screw; 83—current transducer; 84—torque transducer; 85—revolution transducer; 86—wire; 87—engaging flange; 88—engaging groove; 89—shaft hole; 90—cross flat hole; 91—electromagnet base; 92—electromagnet connector, 93—cross hole; 94—screw threads; 95—seesaw holder, 96—shifting fork; 97—shifting fork lever, 98—jack screw; 99—reverse gear shaft; 100—reverse gear; 101—seesaw; 102—shift plate; 103—groove; 104—retainer ring groove; 105—gear button panel; 106—intermediate gear upper wheel; 107—intermediate gear bottom wheel; 108—intermediate single gear; 109—intermediate gear shaft; 110—internal spline shaft sleeve; 111—truncated cone; 112—control actuator, 113—outer flange copper bushing; 114—rear end cover of transmission; 115—gear button; 116—extension bushing; 117—drive shaft tube; 118—internal spline ring; 119—bearing socket; 120—gear display screen; 121—fixed flat disc; 122—hub disc; 123—left connecting disc; 124—damper claw; 125—chassis fork claw; 126—input shaft tube connecting ring; 127—disc type brake; 128—brake shoe; 129—right connecting disc; 130—fixed column; 131—tire; 132—damper, 133—chassis fork; 134—chain wheel; 135—input shaft tube; 136—rear axle of bicycle; 137—O-seal; 138—output shaft tube; 139—grooved wheel; 140—thrust gasket; 141—band-type brake; 142—ejector pin stop plate; 143—needle roller bearing; 144—synchronizer; 145—internal screw thread tube; 146—shift intermediate single gear, 147—oil thread; 148—flexible wire terminal (with threads on outer edge); 149—flexible wire; 150—oil thread stud; 151—fuel engine; 152—engine output shaft; 153—electromagnetic automatic clutch; 154—stud connecting hole; 155—grooved wheel connecting tube; 156—mechanical automatic clutch; 157—copper washer; 159—bayonet.

DETAILED DESCRIPTION OF THE INVENTION

Hereunder the technical scheme of the present invention will be further described in embodiments with reference to the accompanying drawings.

Example 1

As shown in FIGS. 10, 11, 12, 13, 14, 38 and 39, a cylindrical transmission comprises a housing, an input shaft 6, and an output shaft 41. The housing comprises several circular discs with outside lips 69 provided thereon, the input shaft 6 and the output shaft 41 are provided on the center line of the several circular discs, several driving gears 25 are provided on the input shaft 6, a rotary disc 32 is provided on the output shaft 41, and the rotary disc 32 is provided with rotary disc internal teeth 33. Several gear shafts are provided between each two adjacent circular discs, the gear shafts are located on the periphery of the driving gears 25 between the two adjacent circular discs, and several gears are provided on each of the gear shafts. The gears are adjacent to the rotary disc 32, and one of the several gears is disengaged from or engaged with the rotary disc internal teeth 33. The circular discs are connected with each other via the outside lips 69. In actual applications, though the cylindrical transmission has dome, oil pan, etc., which don't form a circular surface completely, there are identical circular surfaces and rabbets among the components. In this embodiment, all discs conforming to such a feature are generally referred to as circular discs of the cylindrical transmission.

An oil charge valve 22, an oil level valve 24 and an oil pan 21 are provided on the housing of the cylindrical transmission, and an oil drain valve 23 is provided on the oil pan; a rabbet 72, a sealing gasket 60 and a positioning pin 67 are provided between the lips of the circular discs; the outside lips 69 are connected by a screw rod 59 and a nut 71 respectively. The above features are common features of the cylindrical transmission, and will not be described in the following embodiments.

In this embodiment, the several circular discs of the cylindrical transmission include a H-disc 16, a fixed disc 29 and rear end cover 114 of transmission. A fixed disc side opening 30 is provided on the fixed disc 29. The gear shaft comprises a transmission gear shaft 61, and the gears include a transmission gear upper wheel 26 and a transmission gear bottom wheel 27. Several driving gears 25 are fixed on the input shaft 6 between the H-disc 16 and the fixed disc 29, and an internal flat surface 62 of fixed disc is provided below the internal teeth 33 of rotary disc. One side of the H-disc 16 is connected to the fixed disc 29 and the rear end cover 114 of transmission. A bearing 5 and an oil seal 1 is provided at the center of the H-disc 16. Two bearings 5 are provided at the center of the fixed disc 29. One end of the input shaft 6 extends into the bearings 5 locating at the center of the fixed disc 29, and the other end of the input shaft 6 extends through the bearing 5 and the oil seal 1 locating at the center of the H-disc 16. The internal flat surface 17 of H-disc and the internal flat surface 62 of fixed disc have several corresponding bearing sockets 119, and the bearings 5 are provided in the bearing sockets 119. Two ends of the transmission gear shaft 61 are inserted into the bearings 5 in the bearing sockets 119 respectively. The transmission gears upper wheel 26 are fixed to the transmission gear shaft 61, an internal spline 57 is provided in the transmission gear bottom wheel, an external spline 7 is provided on the transmission gear shaft, and the transmission gear bottom wheel 27 is cup jointed with the transmission gear shaft 61 via the splines. The several driving gears 25 are engaged with the transmission gears upper wheel 26 respectively. A compression spring 36 is provided below the transmission gear bottom wheel 27. The transmission gear bottom wheel 27 is adjacent to the internal teeth 33 of rotary disc and holds the gap; the transmission gear bottom wheel 27 is disengaged from or engaged with the internal teeth 33 of rotary disc. The rear end cover 114 of transmission is arranged at the outer side of the rotary disc 32.

As shown in FIGS. 11, 12, 13, 14, 38 and 39, several self-retaining electromagnets 53, electromagnet bases 91 and electromagnet connectors 92 are provided on the internal flat surface 17 of H-disc. The self-retaining electromagnets 53 are fixed to the electromagnet bases 91. An electromagnet push-pull rod 66 is provided in each self-retaining electromagnet 53. The electromagnet push-pull rod 66 extends through an oil seal 1 on the electromagnet base 91 and is connected to the electromagnet connector 92, screw threads 94 are provided on the electromagnet push-pull rod, and screw threads 94 are provided on the top surface of the electromagnet connector. A shaft hole 89 and an ejector pin 52 are provided in the transmission gear shaft 61. A copper washer 157, a circlip 28 for shaft, and steel balls 51 are provided on the top end of the ejector pin 52, and the lower end of the ejector pin 52 extends into the shaft hole 89. A bayonet 159 is provided on the bottom of the electromagnet connector 92, and the bayonet 159 is inserted at the bottom side of the copper washer 157. A cross flat hole 90 is provided on the transmission gear shaft 61. The transmission gear bottom wheel 27, transmission gear shaft 61 and ejector pin 52 are connected together in the cross flat hole 90 by a dovetail screw 82, and the dovetail screw extends through the transmission gear bottom wheel and transmission gear shaft and is tightened up in the screw threads at the other side of the transmission gear bottom wheel.

Figure 40:
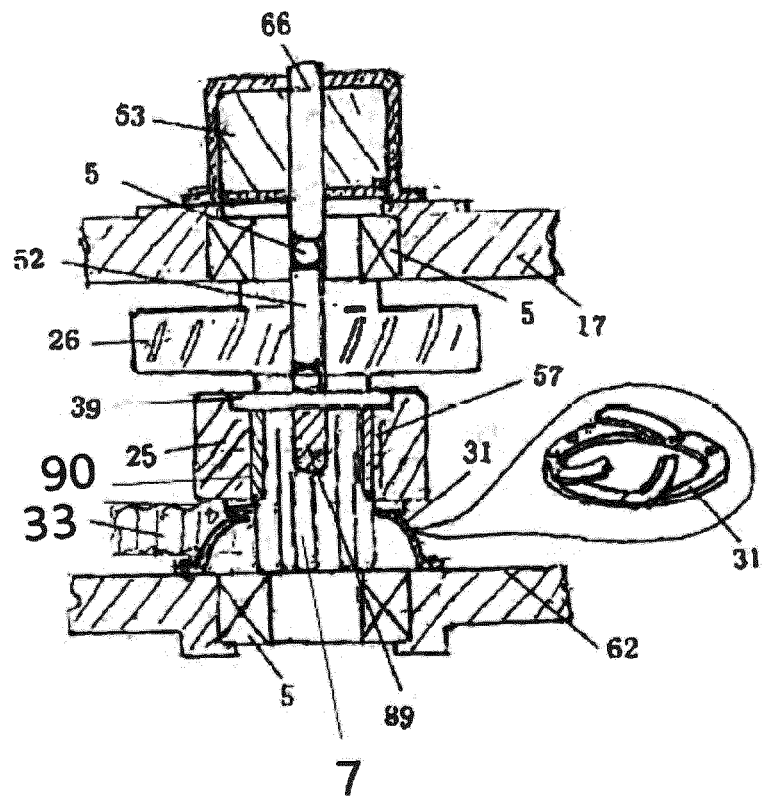
FIG. 40 is a structural schematic view of the self-retaining electromagnet controlling the gear shift of the transmission according to the fourth embodiment.
Figure 41:
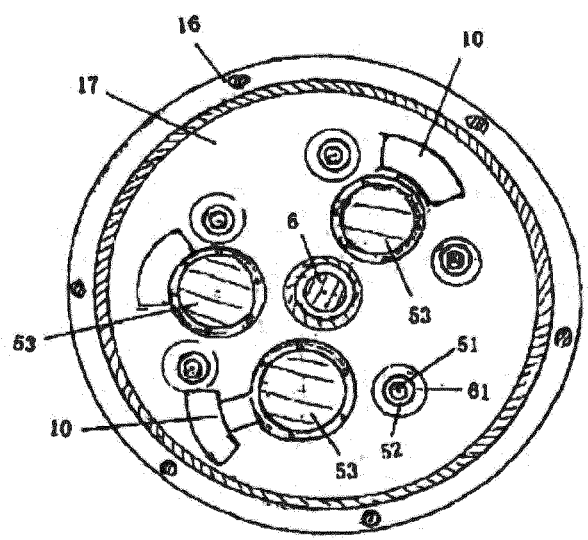
FIG. 41 is a schematic view of controlling the gear shift of the transmission by several control actuators respectively according to the fourth embodiment.

Alternatively, as shown in FIG. 40, several self-retaining electromagnets 53 are provided on the internal flat surface 17 of H-disc. An electromagnet push-pull rod 66 is provided in each self-retaining electromagnet 53. A shaft hole 89 is provided in the transmission gear shaft 61, and an ejector pin 52 and steel balls 51 are provided in the shaft hole 89. The electromagnet push-pull rod 66 is inserted into the shaft hole 89. A cross flat hole 90 is provided in the transmission gear shaft 61, a pin shaft 39 is provided in the cross flat hole 90 and locates above the transmission gear bottom wheel 27, and a leaf spring ring 31 is provided below the transmission gear bottom wheel.

Figure 11:
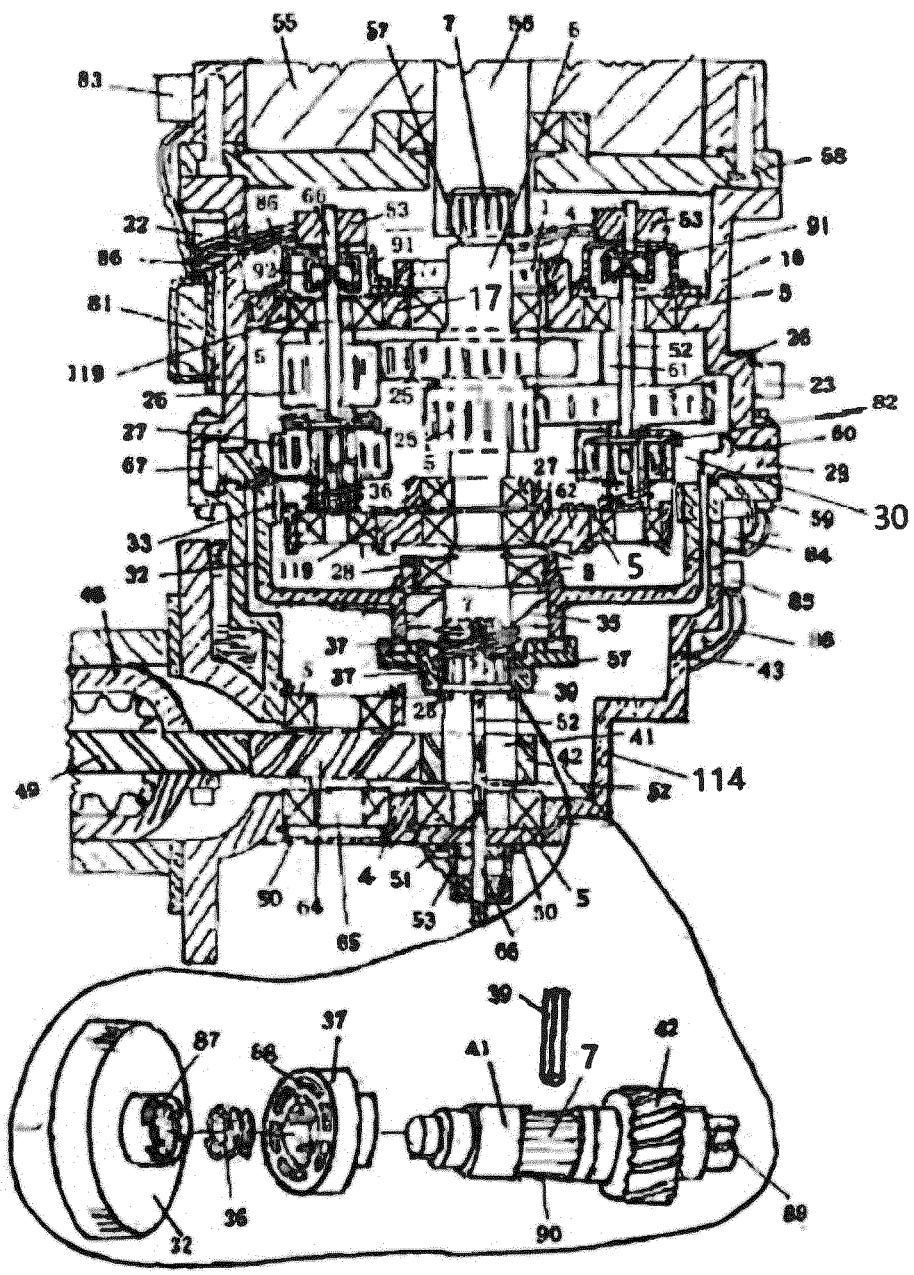
FIG. 11 is a structural sectional view of the transmission connected with a differential on an automobile with an overrunning clutch according to the second embodiment.

As shown in FIG. 11, the top end of the output shaft 41 extends into the bearing 5 at the center of the fixed disc 29, and the bearing 5 and an overrunning clutch 35 are provided between the outer edge of the output shaft 41 and the center of the rotary disc 32. A compression spring 36 and an engagement disc 37 are provided on the output shaft 41 at one side of the overrunning clutch 35. An output gear 42 is provided on the bottom end of the output shaft 41. Steel balls 51 and an ejector pin 52 are provided in the central part of the bottom end of the output shaft 41. An end cap 50 of oil seal is provided on the rear and cover 114 of transmission, and a self-retaining electromagnet 53 is provided on the end cap 50 of oil seal. An external spline 7 is provided on the output shaft, an internal spline 57 is provided in the engagement disc, and the engagement disc 37 is cup jointed with the output shaft 41 via the splines. A cross flat hole 90 is provided on the output shaft 41, and a pin shaft 39 fitted with the cross flat hole 90 is provided on the top end of the engagement disc 37. An engaging flange 87 is provided at one side of the rotary disc, an engaging groove 88 is provided on the engagement disc, and the engagement disc 37 is disengaged from or engaged with one side of the center of the rotary disc 32.

Figure 12:
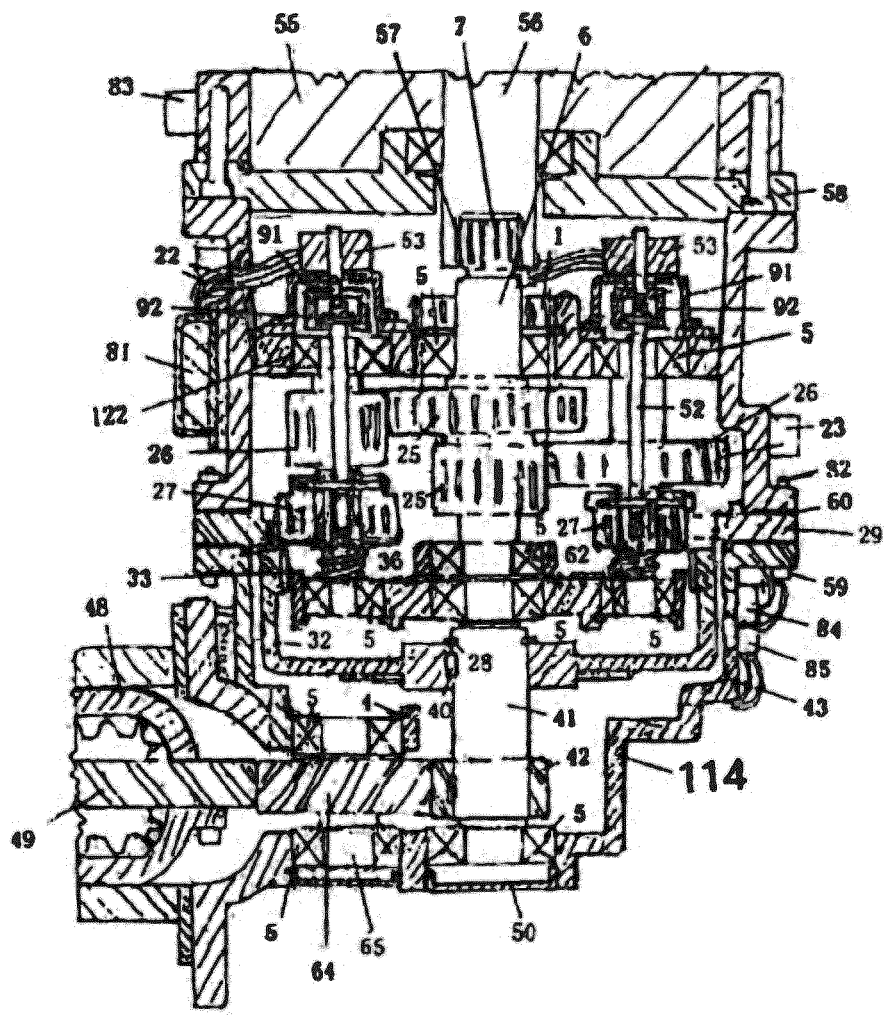
FIG. 12 is a sectional view of the transmission connected with a differential on an automobile without overrunning clutch according to the second embodiment.
Figure 13:
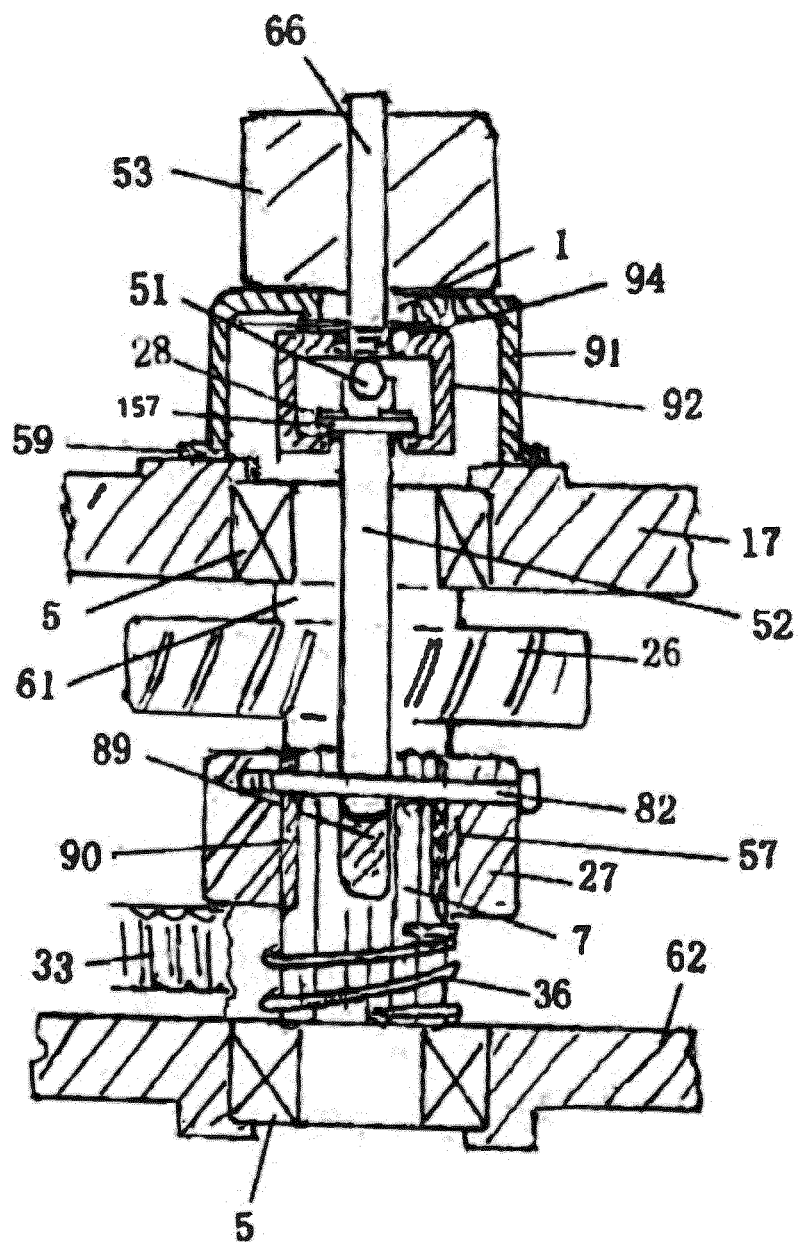
FIG. 13 is a structural schematic view of the self-retaining electromagnet controlling the lifting of the transmission gear bottom wheel according to the second embodiment.
Figure 14:
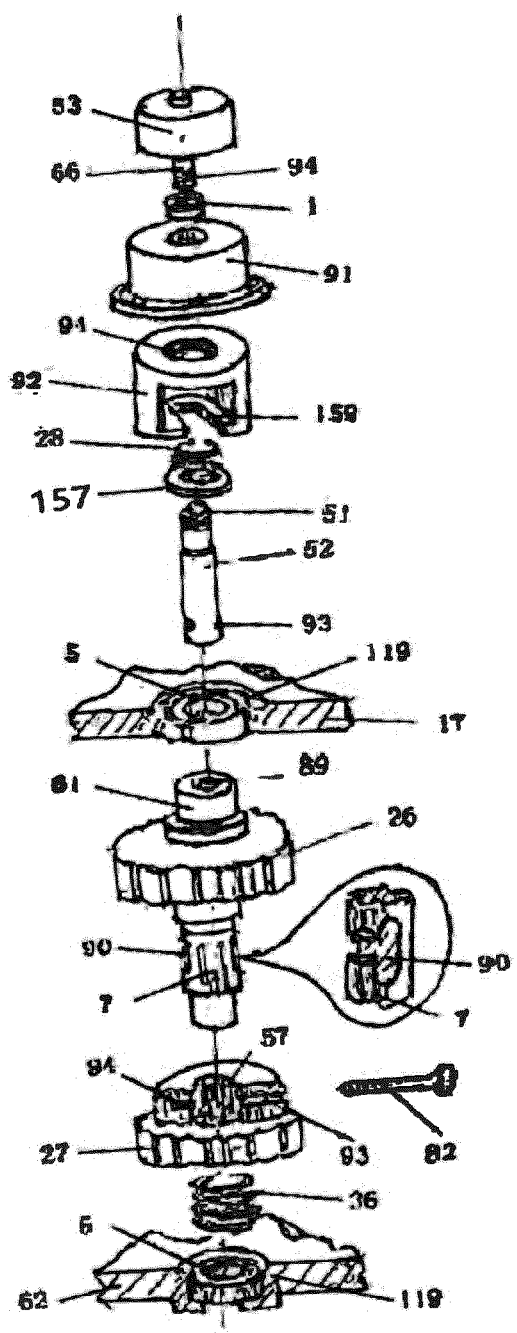
FIG. 14 is a component view of the self-retaining electromagnet controlling the lifting of the transmission gear bottom wheel according to the second embodiment.

As shown in FIG. 12, the center of the rotary disc 32 is fixed to the output shaft 41, the top end of the output shaft 41 extends into the bearing 5 at the center of the fixed disc 29, an output gear 42 is provided on the bottom end of the output shaft 41, and the bottom end of the output shaft 41 extends into the bearing 5 on the rear end cover 114 of transmission. An oil seal end cap 50 is provided on the rear end of the transmission.

Figure 38:
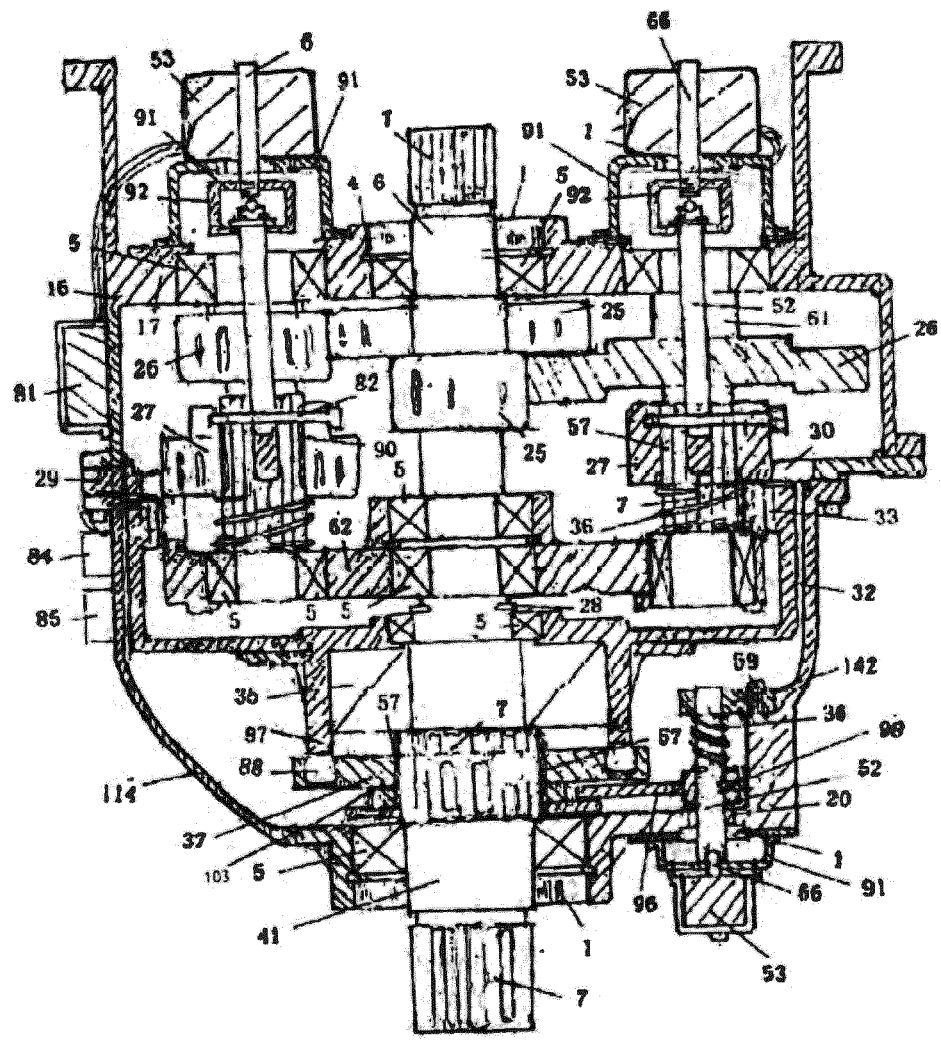
FIG. 38 is a structural sectional view of the rear wheel drive transmission on an electric automobile with an overrunning clutch according to the fourth embodiment.
Figure 39:
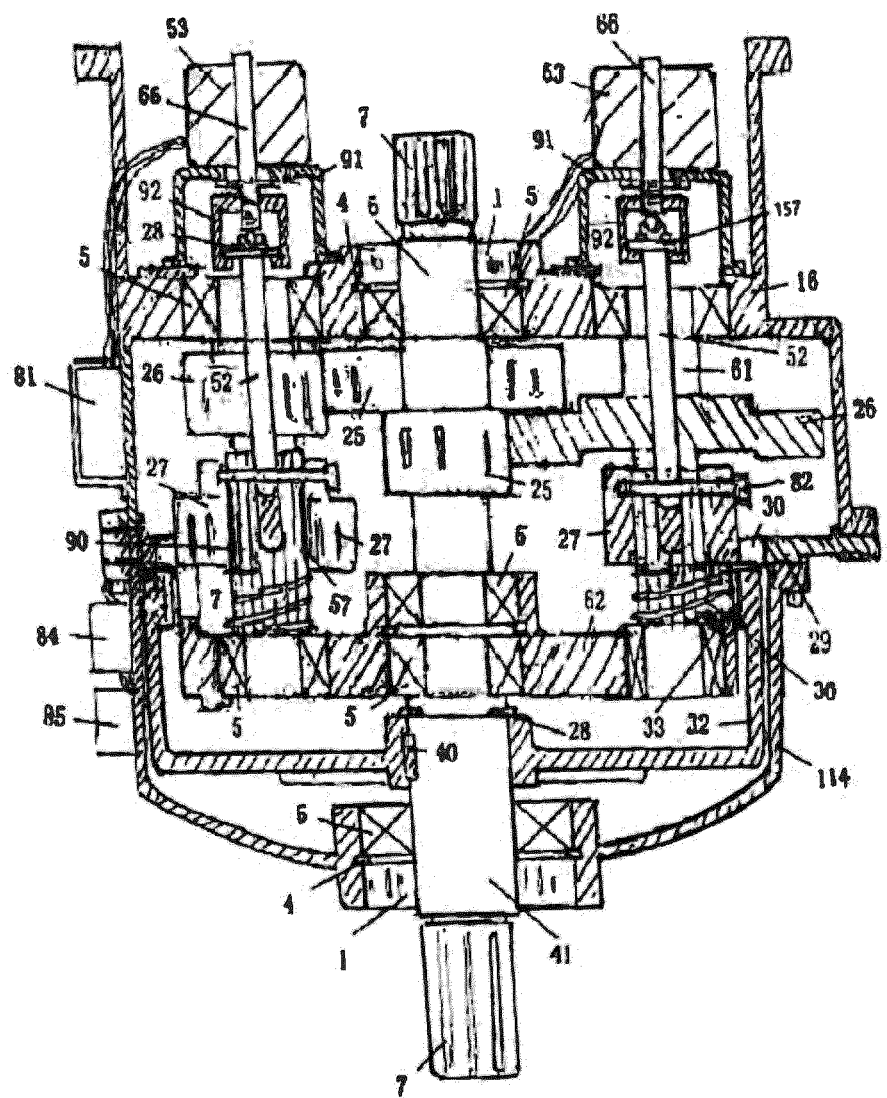
FIG. 39 is a structural sectional view of the rear wheel drive transmission on an electric automobile without an overrunning clutch according to the fourth embodiment.

As shown in FIG. 38, the top end of the output shaft 41 extends into the bearing 5 at the center of the fixed disc 29, and a bearing 5 and an overrunning clutch 35 are provided between the outer edge of the output shaft 41 and the center of the rotary disc 32. The engagement disc 37 is provided on the output shaft 41 at one side of the overrunning clutch 35. The engagement disc 37 is cup jointed with the output shaft 41 via splines. The engagement disc 37 is disengaged from or engaged with one side of the center of the rotary disc 32. The bottom end of the output shaft 41 extends through the bearing 5 and the oil seal 1 on the rear end cover 114 of transmission. An ejector pin stop plate 142, an ejector pin 52 and a shifting fork 96 are provided on the inner wall of the rear end cover 114 of transmission, and the shifting fork 96 is inserted to the outer edge of a groove 103 provided in the engagement disc 37. A compression spring 36 is provided on the outer edge of the ejector pin 52, a self-retaining electromagnet 53 is provided on the rear end cover 114 of transmission at the bottom end of the ejector pin 52. The ejector pin 52 extends through holes on the rear end cover 114 of transmission and a hole in the ejector pin stop plate 142.

Figure 24:
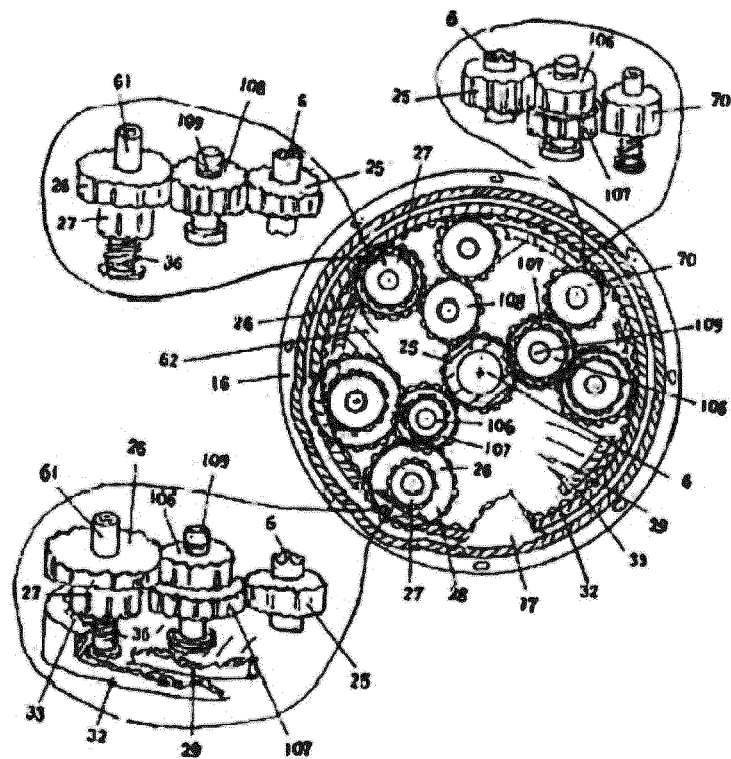
FIG. 24 is a schematic view of the second embodiment provided with intermediate gear and transmission gear.
Figure 25:
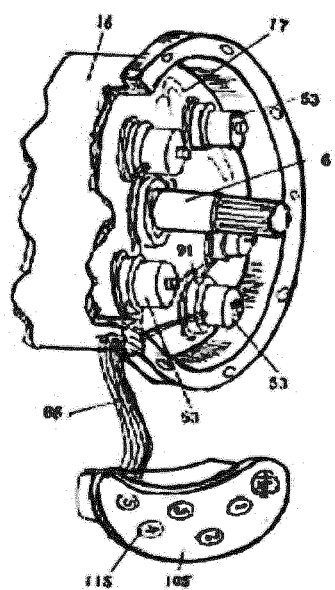
FIG. 25 is a schematic view of controlling the self-retaining electromagnet and the shift of the transmission by buttons according to the second embodiment.

As shown in FIG. 24, the gear shafts further include an intermediate gear shaft 109. The gear further includes an intermediate gears upper wheel 106 and an intermediate gear bottom wheel 107. The driving gears 25 are fixed to the input shaft 6 between the internal flat surface 17 of H-disc and the fixed disc 29. The driving gears 25 is engaged with the intermediate gear upper wheel 106 or the intermediate gear bottom wheel 107, and the intermediate gear upper wheel 106 or the intermediate gear bottom wheel 107 is engaged with the transmission gear upper wheel 26.

Figure 15:
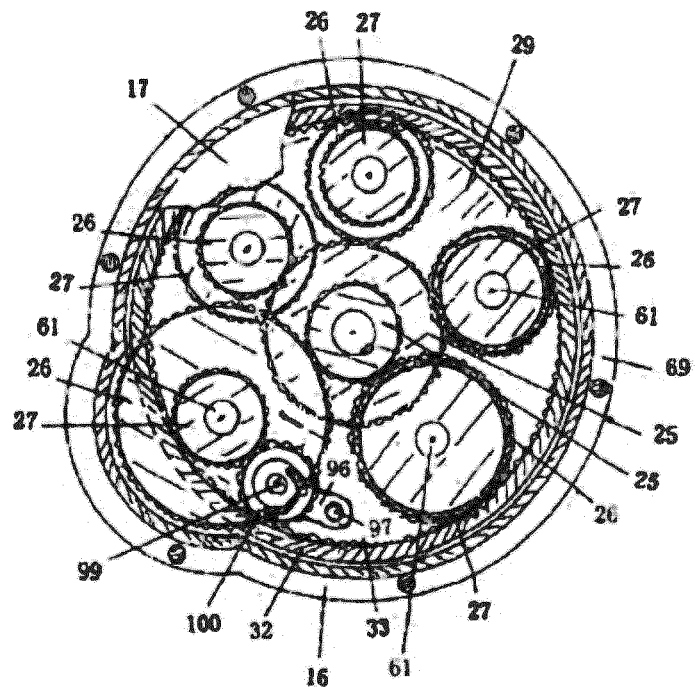
FIG. 15 is a circular sectional view illustrating the arrangement of forward gear and reverse gear in the transmission of an automobile according to the second embodiment.
Figure 16:
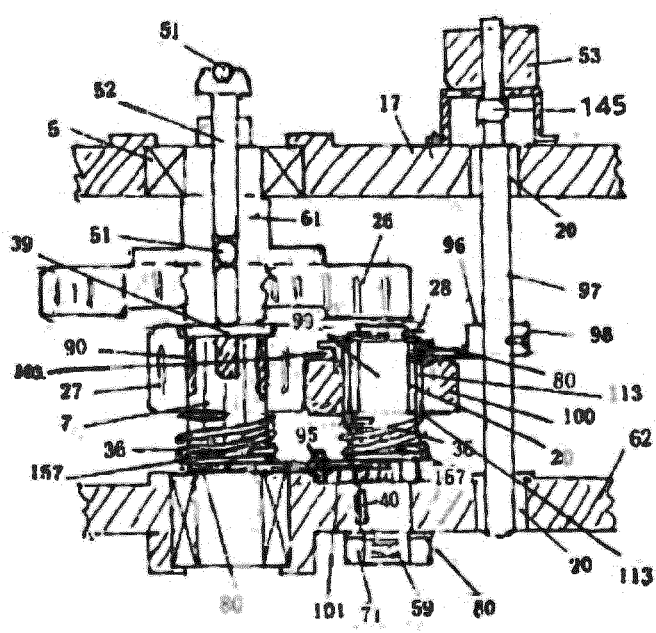
FIG. 16 is a structural view of the arrangement of reverse gear in the transmission of an automobile according to the second embodiment.
Figure 26:
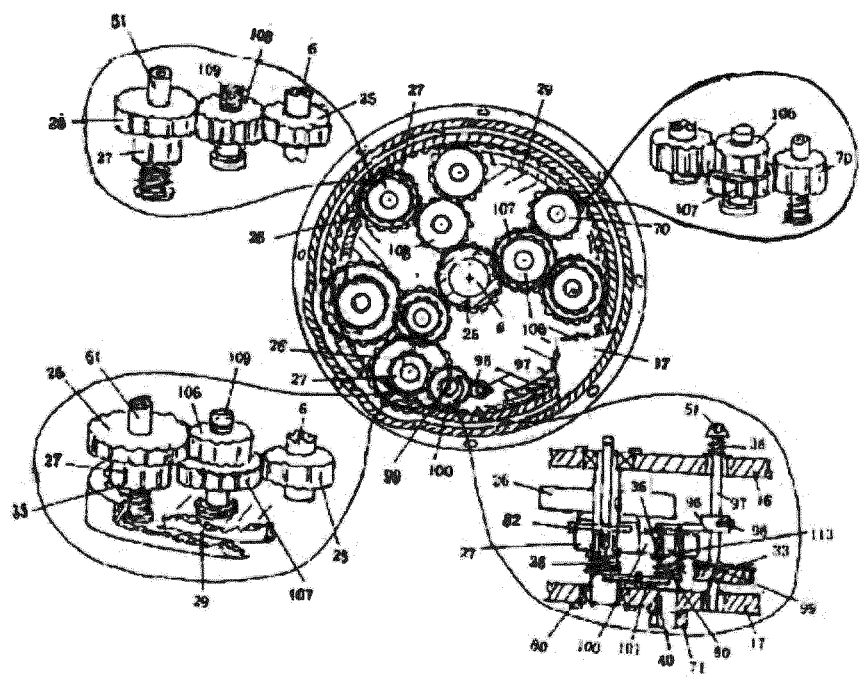
FIG. 26 is a schematic view of the engagement among intermediate gear, transmission gear and reverse gear according to the second embodiment.
Figure 27:
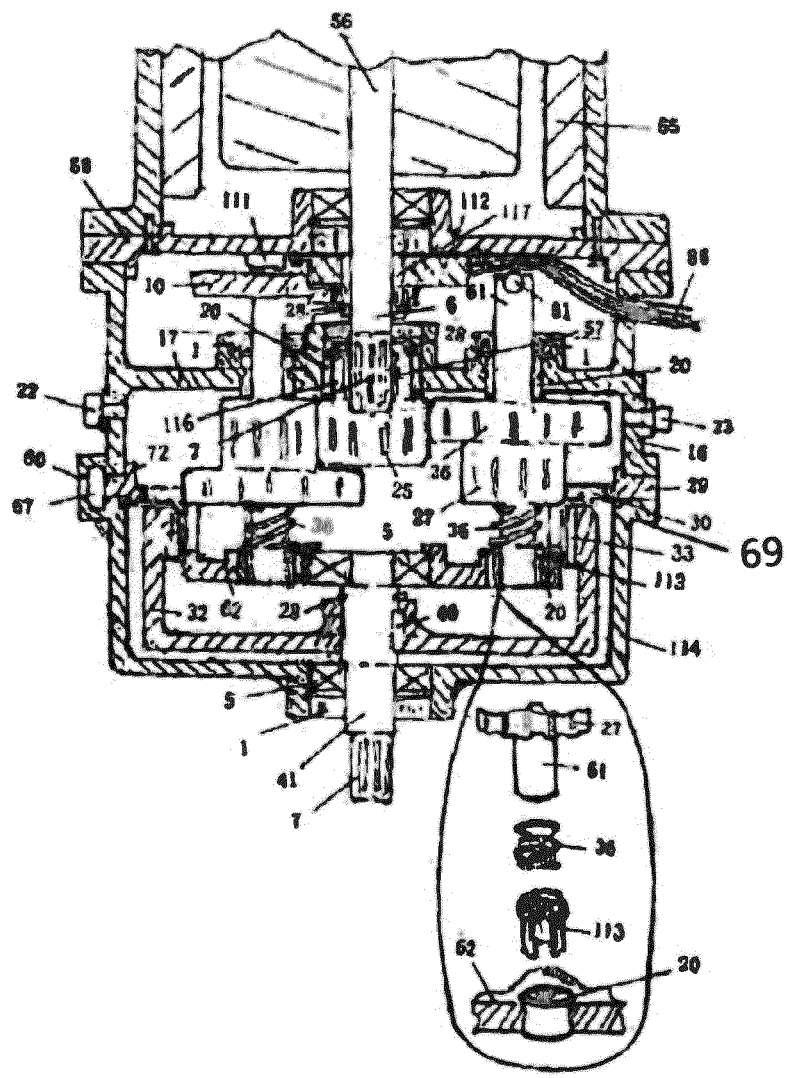
FIG. 27 is a structural sectional view of controlling the gear shift of the transmission by a control actuator according to the second embodiment.
Figure 28:
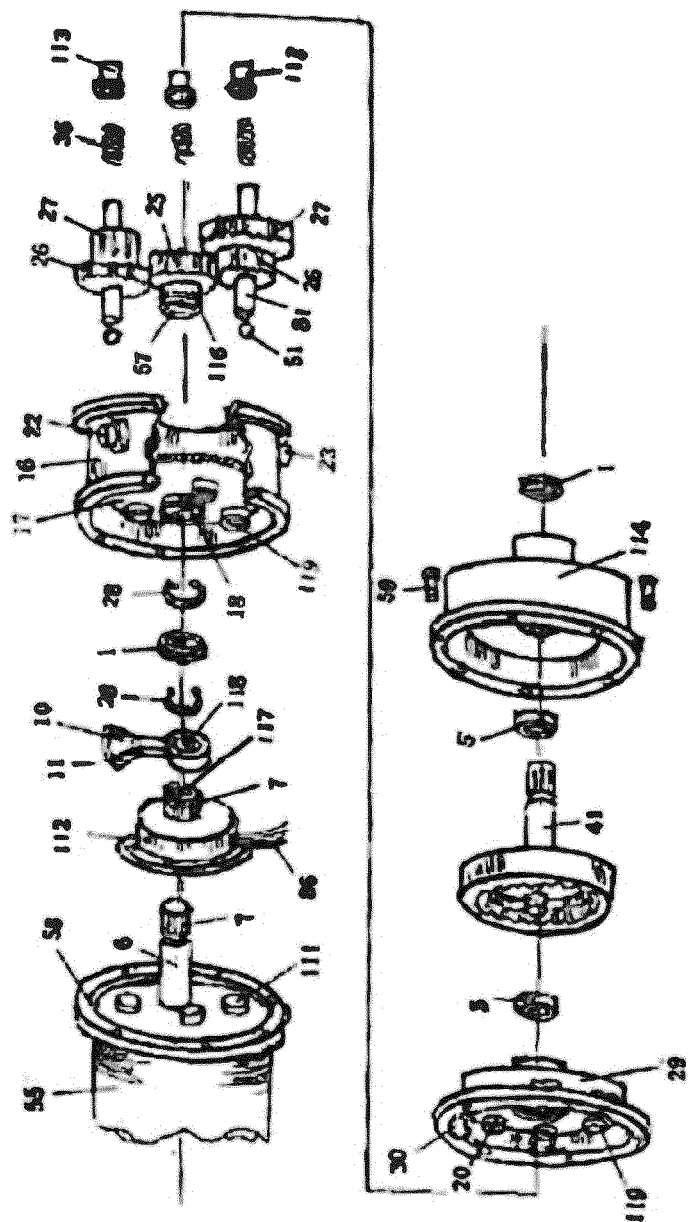
FIG. 28 is a component view of controlling the gear shift of the transmission by a control actuator according to the second embodiment.
Figure 29:
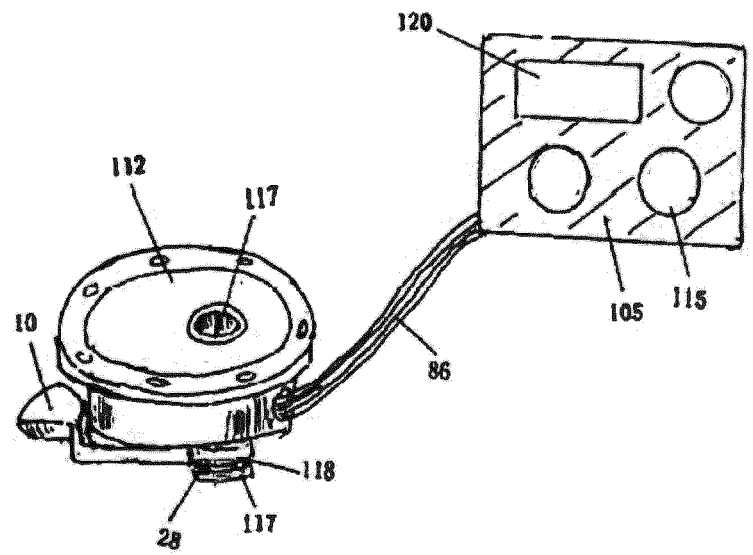
FIG. 29 is a view of the control actuator and control buttons for controlling the gear shift of the transmission by a control actuator according to the second embodiment.
Figure 30:
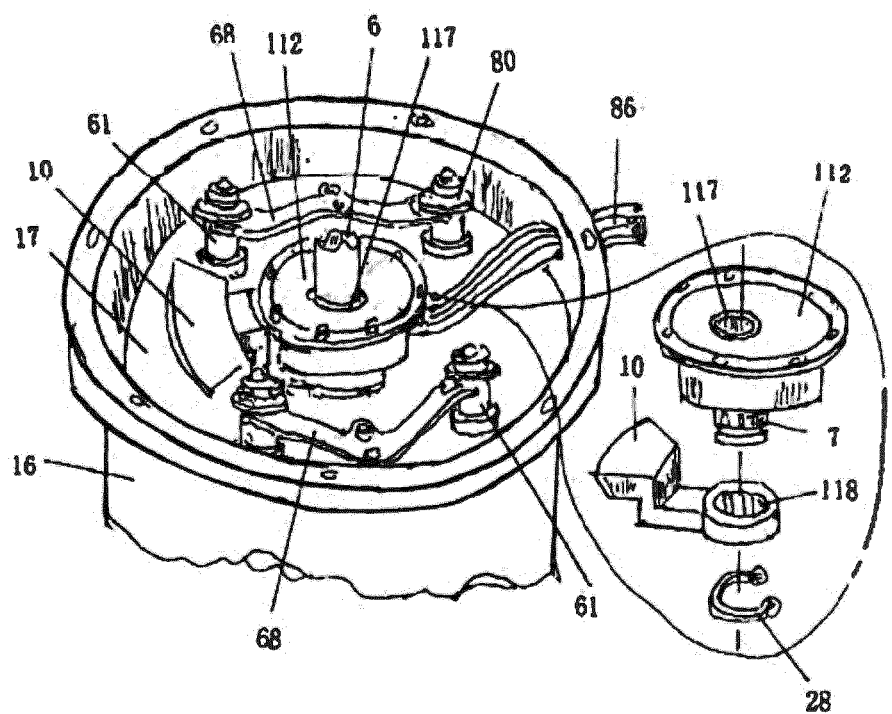
FIG. 30 is a schematic view of the shifting mode for controlling the gear shift of the transmission by a control actuator according to the second embodiment.
Figure 31:
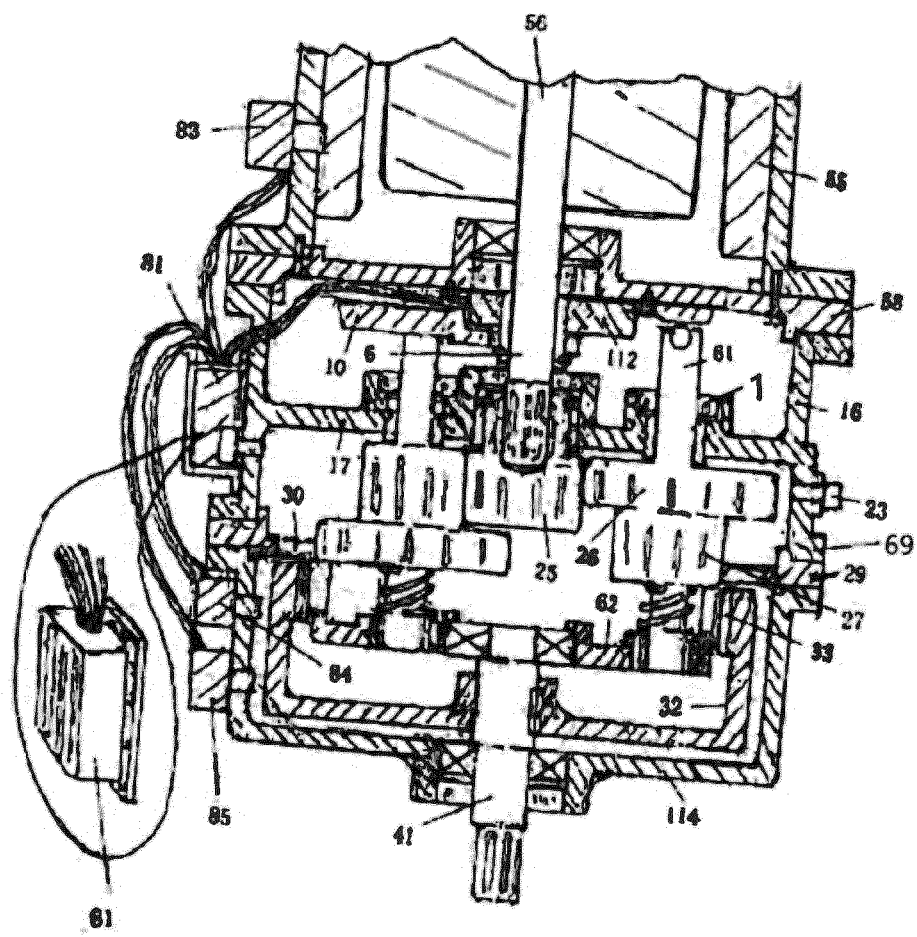
FIG. 31 is a structural sectional view of the automatic transmission controlling the gear shift by a control actuator according to the second embodiment.

As shown in FIGS. 15, 16 and 26, the gears further include a reverse gear 100. The transmission gear bottom wheel 27 and the reverse gear 100 are arranged above the internal teeth 33 of rotary disc, and the transmission gear bottom wheel 27 is disengaged from or engaged with the internal teeth 33 of rotary disc. The reverse gear 100 is engaged with the transmission gear bottom wheel 27. The reverse gear 100 is fixed to the internal flat surface 62 of fixed disc via a reverse gear shaft 99. A compression spring 36 is provided on the outer edge of the reverse gear shaft 99, and a plain washer 80 and a circlip 28 for shaft are provided on the top end of the reverse gear shaft 99. A seesaw 101 is provided below the compression spring 36. An outer flange copper bushing 113 is provided at the center of the reverse gear 100, and a solid lubricant embedded bearing 20 is provided on the reverse gear shaft 99. A gear shift control device is provided at one side of the reverse gear 100, and the gear shift control device comprises a shifting fork lever 97 and a first shifting fork 96. The shifting fork lever 97 is arranged between the H-disc internal flat surface 17 and the fixed disc internal flat surface 62 and extends through the H-disc internal flat surface 17. The first shifting fork 96 is fixed to the shifting fork lever 97 and inserted to the outer edge of the groove 103 arranged on the top end of the reverse gear 100. The reverse gear 100 is disengaged from or engaged with the internal teeth 33 of rotary disc.

Figure 42:
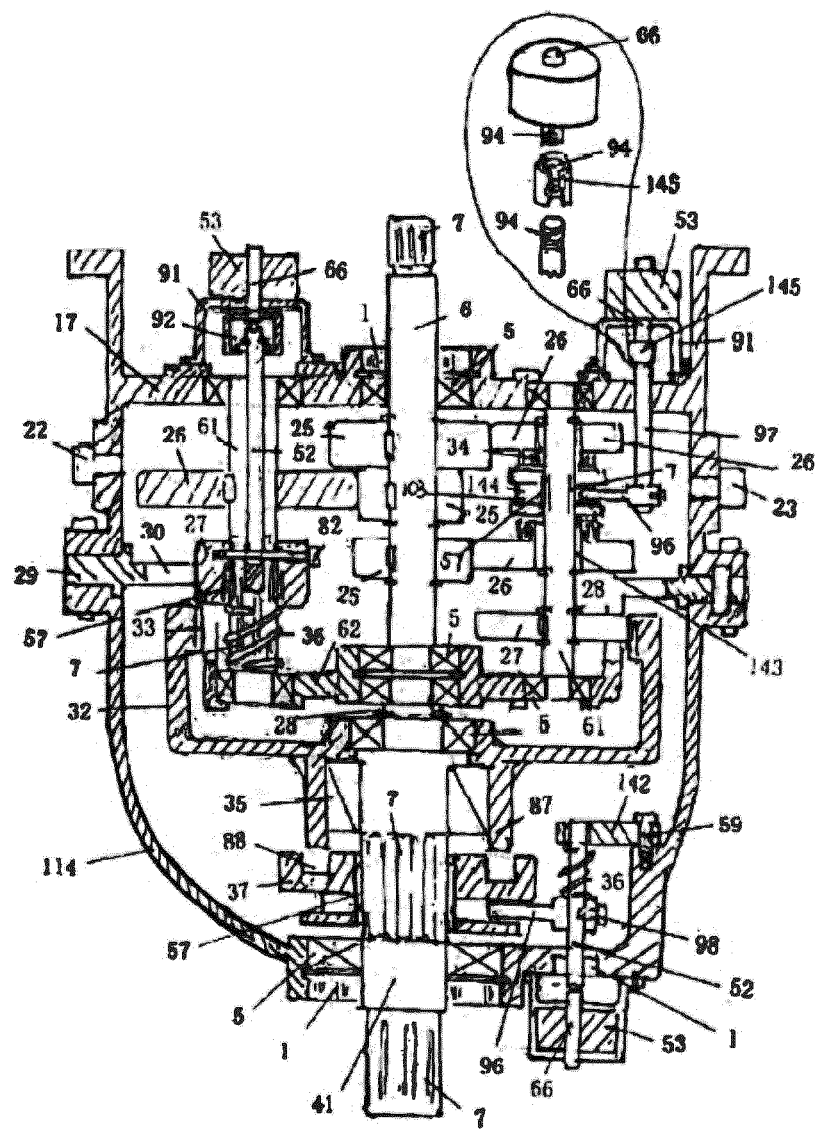
FIG. 42 is a structural sectional view of the transmission with a plurality of transmission gear upper wheels in which the gear shift is controlled by a shifting fork according to the fourth embodiment.
Figure 43:
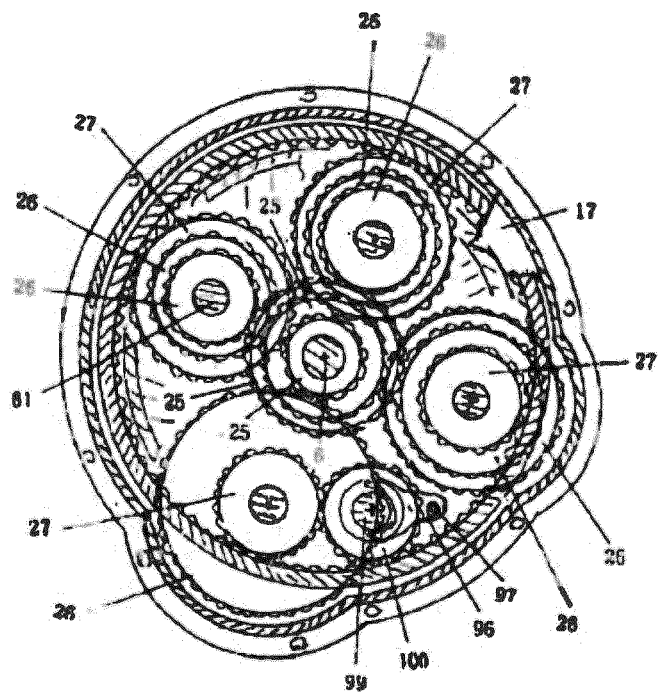
FIG. 43 is a circular sectional view of the transmission with a plurality of transmission gear upper wheels according to the fourth embodiment.

As shown in FIGS. 42 and 43, a synchronizer 144 is provided between two adjacent transmission gear upper wheels 26, the synchronizer 144 is cup jointed with the transmission gear shaft 61 via splines, an internal spline 57 is provided on the synchronizer, and an external spline 7 is provided on the transmission gear shaft. Internal teeth 38 to be engaged are provided on the synchronizer, and external teeth 34 to be engaged fitted with the internal teeth 38 to be engaged are provided on the transmission gear upper wheels 26. The transmission gear bottom wheel 27 is fixed to the transmission gear shaft 61 and engaged with the internal teeth 33 of rotary disc. Needle roller bearings 143 are provided between the several transmission gear upper wheels 26 and the transmission gear shaft 61. The gear shift device further comprises a second shifting fork 96 inserted into the outer edge of a groove 103 in the synchronizer 144 provided on the transmission gear shaft 61.

As shown in FIGS. 11, 12, 25, 38, 39 and 41, in this embodiment, the structure of an automatic gear shift control device of the cylindrical transmission comprises: several self-retaining electromagnets 53 provided on the internal flat surface 17 of H-disc, an electronic automatic controller 81 connected with the self-retaining electromagnets 53 through wires 86, a torque transducer 84 and a revolution transducer 85 provided on the periphery of the rotary disc 32 on the rear end cover 114 of transmission, and a current transducer provided on the motor 55. The torque transducer 84, revolution transducer 85, and current transducer 83 are connected to the electronic automatic controller 81 through wires 86, and a gear shift transducer may be provided in the electronic automatic controller.

Figure 17:
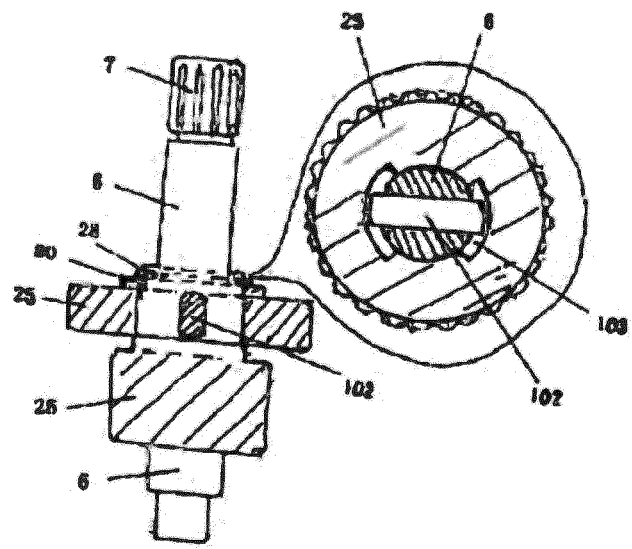
FIG. 17 is a schematic view of the flexible connection between the driving gear and the input shaft according to the second embodiment.
Figure 18:
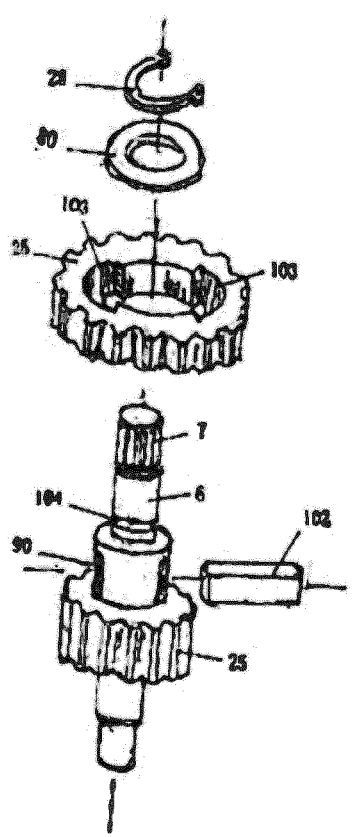
FIG. 18 is a component view of the flexible connection between the driving gear and the input shaft according to the second embodiment.
Figure 19:
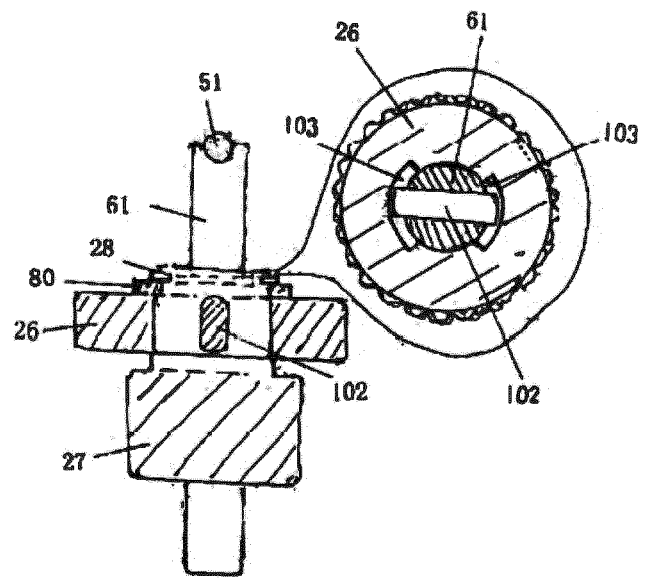
FIG. 19 is a schematic view of the flexible connection between the transmission gear upper wheel and the transmission gear shaft according to the second embodiment.
Figure 20:
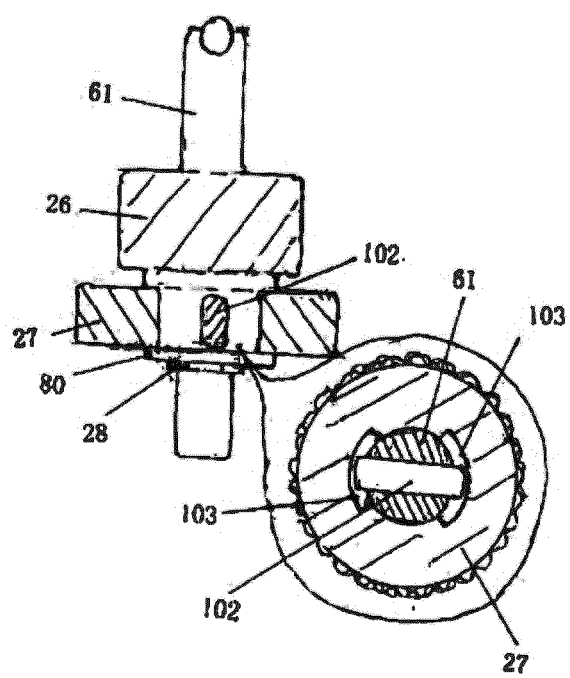
FIG. 20 is a schematic view of the flexible connection between the transmission gear bottom wheel and the transmission gear shaft according to the second embodiment.
Figure 22:
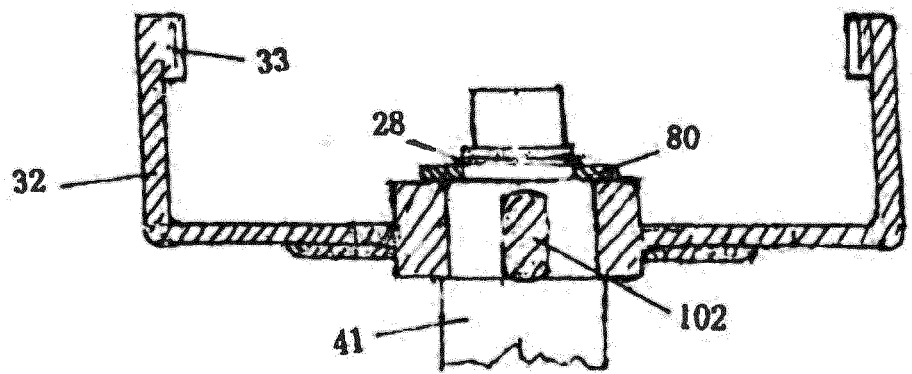
FIG. 22 is a sectional structural view of the flexible connection between the center of the rotary disc and the output shaft according to the second embodiment.
Figure 32:
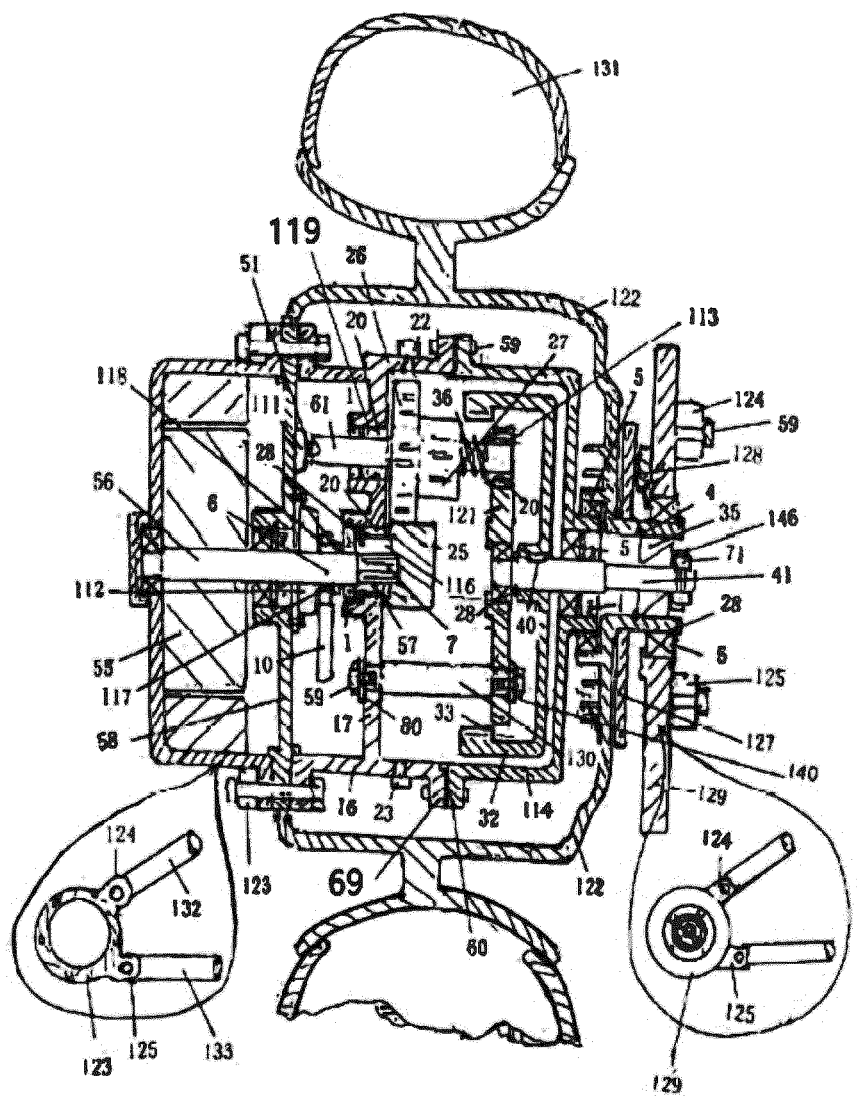
FIG. 32 is a sectional structural view of the rear wheel drive transmission of an electric scooter according to a third embodiment.
Figure 47:
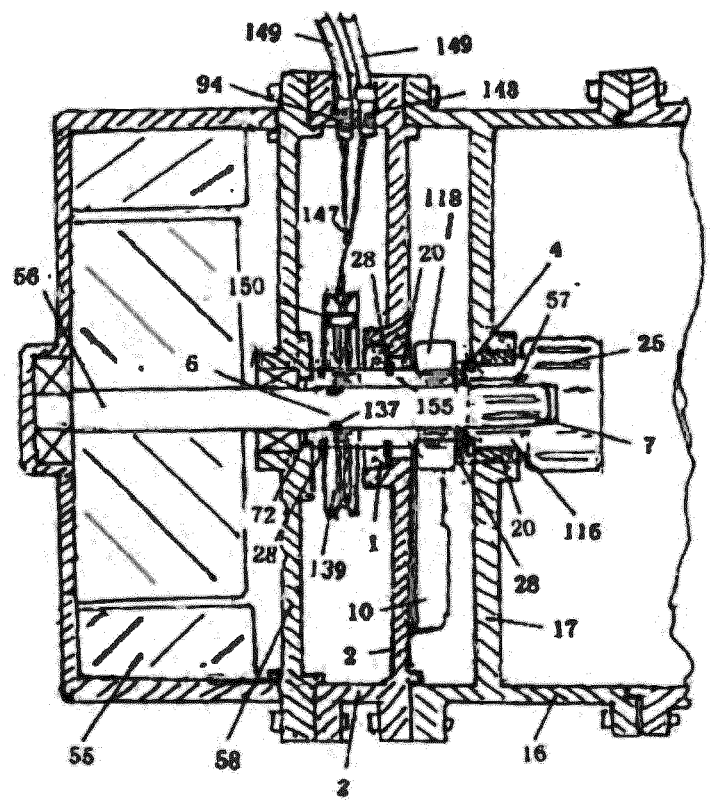
FIG. 47 is a structural sectional view of the grooved wheel for gear shift according to the fifth embodiment.
Figure 51:
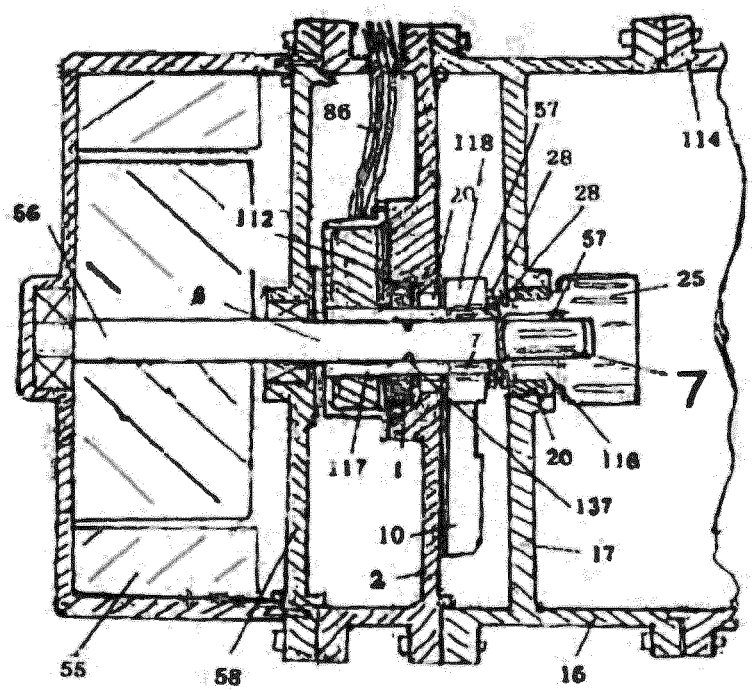
FIG. 51 is a structural view of the control actuator provided on the center of the front end cover of transmission according to the fifth embodiment.

As shown in FIGS. 32, 47 and 51, an extension bushing 116 is provided on the driving gear 25, and an internal spline 57 is provided in the extension bushing 116. The extension bushing 116 extends through the solid lubricant embedded bearing 20 at the center of the H-disc 16, and a circlip 28 for shaft is provided on the end of the extension bushing 116. An external spline 7 is provided on the end of the input shaft 6. The input shaft 6 extends through a driving shaft tube 117 of an external driving device, and then extends into the center of the H-disc 16 and the extension bushing 116. As shown in FIGS. 17 and 18, a first groove 103 is provided in the inner circle of the driving gear 25, a first cross flat hole 90 is provided on the input shaft 6 in the inner circle of the driving gear 25, and a first shift plate 102 is provided in the first cross flat hole 90. The first groove 103 is fitted into the outer edge of the first shift plate 102, and a first plain washer 80 and a first circlip 28 for shaft are provided on the upper side of the driving gear 25. As shown in FIG. 19, a second groove 103 is provided in the inner circle of the transmission gear upper wheel 26, a second cross flat hole 90 is provided on the transmission gear shaft 61 in the inner circle of the transmission gear upper wheel 26, and a second shift plate 102 is provided in the second cross flat hole 90. The second groove 103 is fitted into the outer edge of the second shift plate 102, and a second plain washer 80 and a second circlip 28 for shaft are provided on the upper side of the transmission gear upper wheel 26. As shown in FIG. 20, a third groove 103 is provided in the inner circle of the transmission gear bottom wheel 27, a third cross flat hole 90 is provided in the transmission gear shaft 61 in the center of inner circle of the transmission gear bottom wheel 27, and a third shift plate 102 is provided in the third cross flat hole 90. The third groove 103 is fitted into the outer edge of the third shift plate 102, and a third plain washer 80 and a third circlip 28 for shaft are provided on the lower side of the transmission gear bottom wheel 27. As shown in FIGS. 22 and 23a a fourth groove 103 is provided in the inner circle of the center of the rotary disc 32, a fourth cross flat hole 90 is provided in the output shaft 41 in the center of the rotary disc 32, and a fourth shift plate 102 is provided in the fourth cross flat hole 90. The fourth groove 103 is fitted into the outer edge of the fourth shift plate 102, and a fourth plain washer 80 and a fourth circlip 28 for shaft are provided on the inner side of the rotary disc 32 on the output shaft 41.

Figure 21:
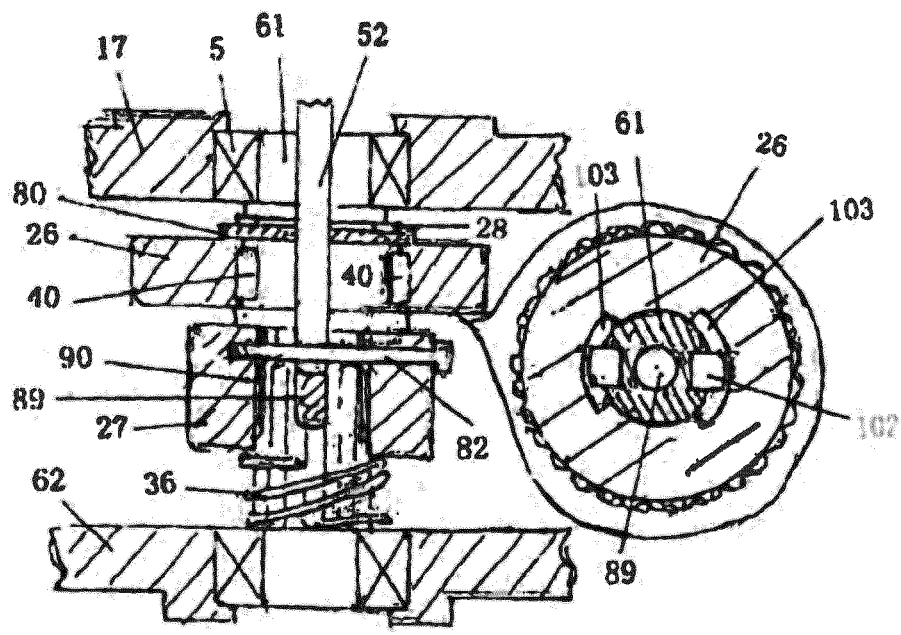
FIG. 21 is a schematic view of the flexible connection between the transmission gear upper wheel with dialing mechanism and the transmission gear shaft according to the second embodiment.

Alternatively, as shown in FIG. 21, the second groove 103 is provided in the inner circle of the transmission gear upper wheel 26, two opposite fourth shift plates 102 are provided on the transmission gear shaft 61 in the the center of inner circle of the transmission gear upper wheel 26, and the second groove 103 is fitted into the outer edges of the two fourth shift plates 102. A second plain washer 80 and a second circlip 28 for shaft are provided on the upper side of the transmission gear upper wheel 26.

As shown in FIGS. 12, 31, 39 and 45, one end of the output shaft 41 extends into the bearing 5 located at the center of the fixed disc 29, and the other end of the output shaft 41 extends through the bearing 5 and oil seal 1 in the rear end cover 114 of transmission. The center of the rotary disc 32 is fixed to the output shaft 41.

The cylindrical transmission in this embodiment realizes automatic gear shift control simply. The electronic automatic controller controls different self-retaining electromagnets according to the data from the transducers, and controls the transmission gear bottom wheel to be disengaged from or engaged with the internal teeth of rotary discs, so as to achieve the automatic gear shift. Compared with other automatic transmissions in the prior art, the cylindrical transmission provided in the present invention has advantages of smaller volume, lower costs, and simpler implementation, avoiding the complexity of dual-clutch transmissions and high oil consumption of hydraulic automatic transmissions. It is difficult to configure hydraulic automatic transmissions, dual-clutch transmissions, or continuously variable transmissions with the motors on electric vehicle. In contrast, the cylindrical transmission in this embodiment can be configured to match well with the motors because it has a cylindrical shape and has characteristics of small volume, large speed difference, and low costs, so as to produce an cost-effective innovative automatic transmission.

Example 2

As shown in FIGS. 1, 2, 3, 4, 5, 6 and 8, in the cylindrical transmission of this embodiment, the several circular discs include front end cover 2 of transmission, H-disc 16, fixed disc 29 and rear housing 43 of transmission. The rear housing 43 of transmission forms an integral structure with a differential case 44. Among the circular discs, the two adjacent circular discs are the H-disc 16 and fixed disc 29. The fixed disc 29 has a fixed disc side opening 30, and the internal flat surface 62 of fixed disc is arranged below the internal teeth 33 of rotary disc. The gear shafts include a transmission gear shaft 61. The gear include a transmission gear upper wheel 26 and a transmission gear bottom wheel 27, or the gear is a transmission single gear 70. One end of the input shaft 6 extends through bearing 5 and oil seal 1 at the center of the front end cover 2 of transmission, the other end of the input shaft 6 extends through a bearing 5 at the center of the H-disc 16. The driving gears 25 are fixed to the end of the input shaft 6 between the H-disc 16 and the fixed disc 29. The internal flat surface 17 of H-disc and the internal flat surface 62 of fixed disc have several corresponding bearing sockets 119, and solid lubricant embedded bearings 20 are provided in the bearing sockets 119. The transmission gear upper wheel 26 and the transmission gear bottom wheel 27 are fixed to the transmission gear shaft 61 between the H-disc 16 and the fixed disc 29. The transmission gear shaft 61 is arranged below the front end cover 2 of transmission, and has steel balls 51 in the central part of the top end of the transmission gear shaft 61. The top end of the transmission gear shaft 61 extends through the solid lubricant embedded bearing 20 in the internal flat surface 17 of H-disc, the bottom end of the transmission gear shaft 61 extends into the solid lubricant embedded bearing 20 in the internal flat surface 62 of fixed disc, a leaf spring ring 31 is provided on the bottom surface 62 of the internal flat surface of fixed disc, and steel balls 51 and a stud 63 are provided in the central part of the bottom end of the transmission gear shaft 61. The transmission gear bottom wheel 27 and the internal teeth 33 of rotary disc are adjacent to each other, with clearance between them. The driving gears 25 are engaged with the transmission gear upper wheel 26. The transmission gear bottom wheel 27 is disengaged from or engaged with the internal teeth 33 of rotary disc. One side of the H-disc 16 is connected to the front and cover 2 of transmission, and the other side of the H-disc 16 is connected to the fixed disc 29 and the rear housing 43 of transmission.

Figure 2:
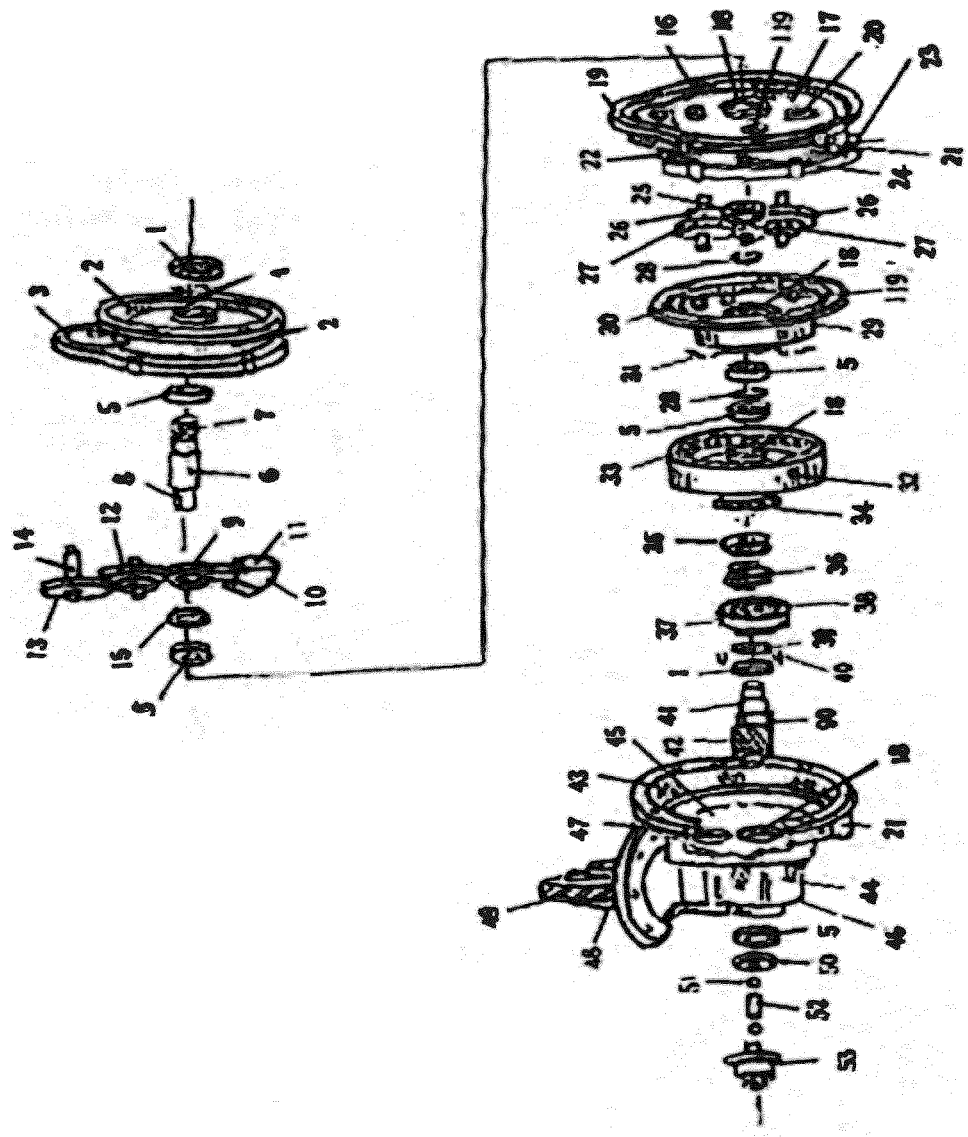
FIG. 2 is a component view of the cylindrical transmission connected with a differential on an electric tricycle with an overrunning clutch according to the first embodiment.
Figure 3:
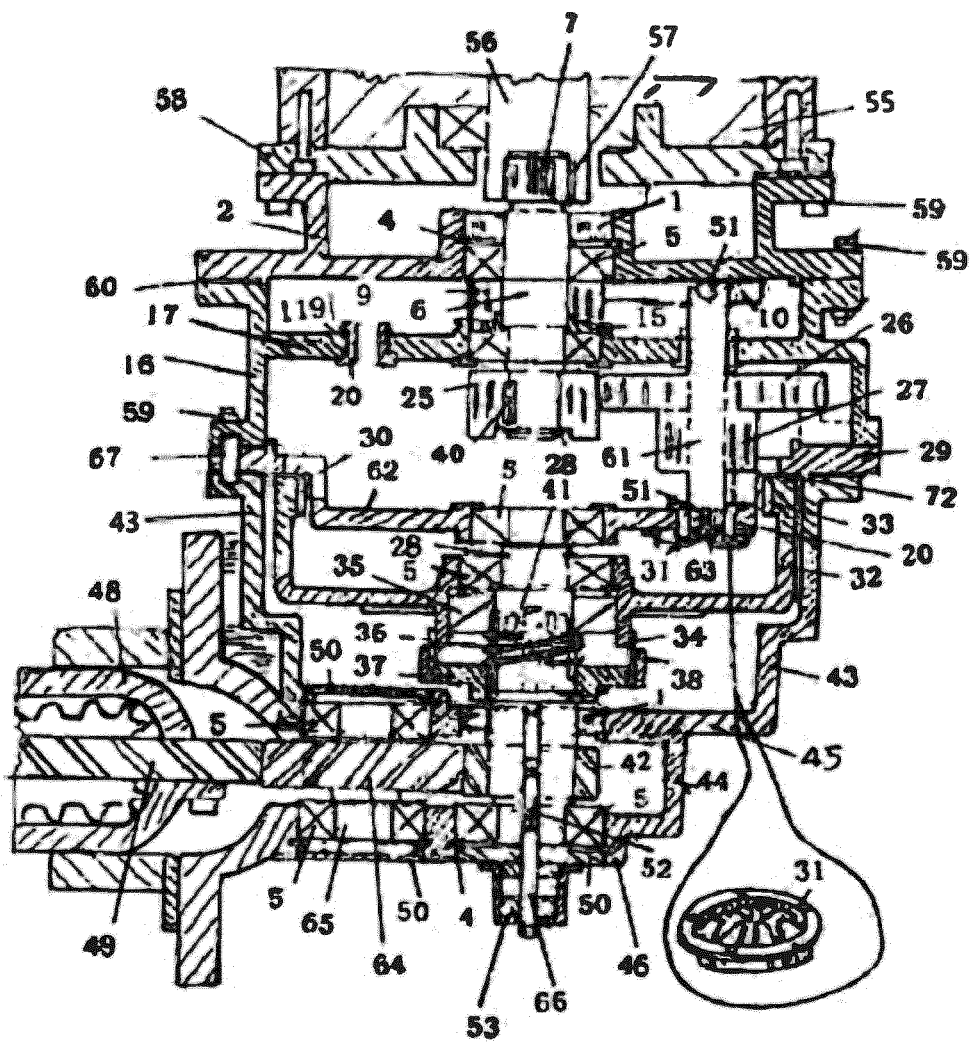
FIG. 3 is a cross sectional view of the cylindrical transmission connected with a differential on an electric tricycle with an overrunning clutch according to the first embodiment.
Figure 4:
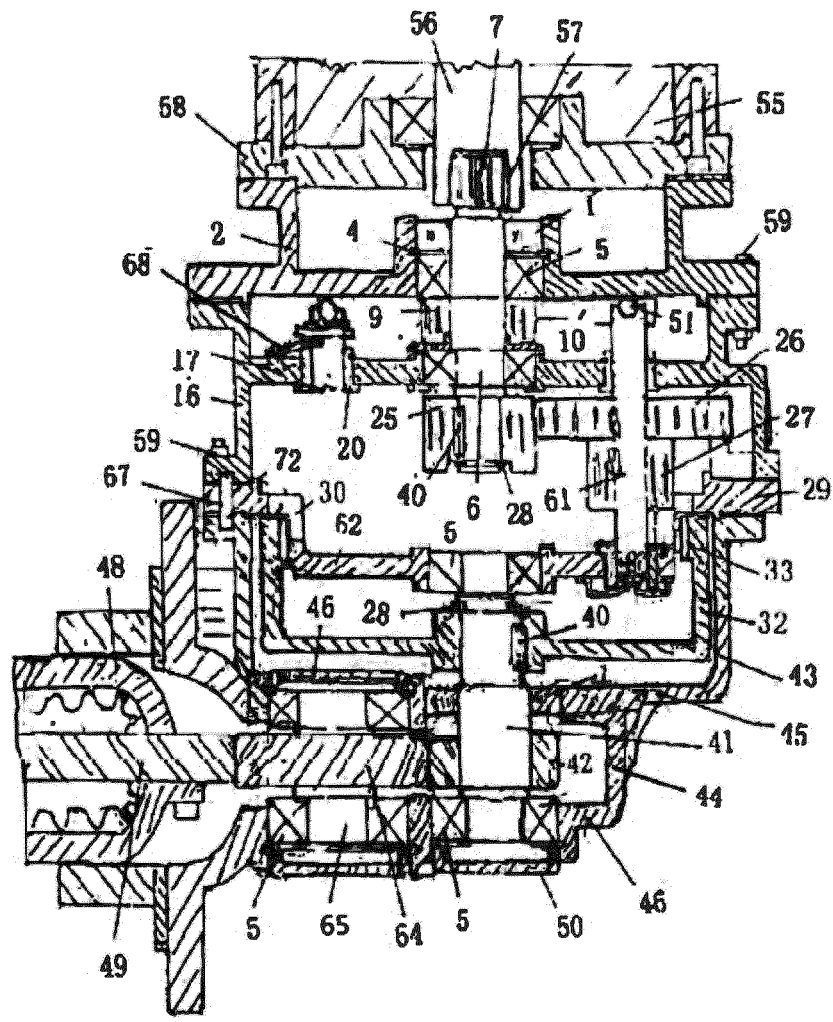
FIG. 4 is a cross sectional view of the cylindrical transmission connected with a differential on an electric tricycle without overrunning clutch according to the first embodiment.
Figure 5:
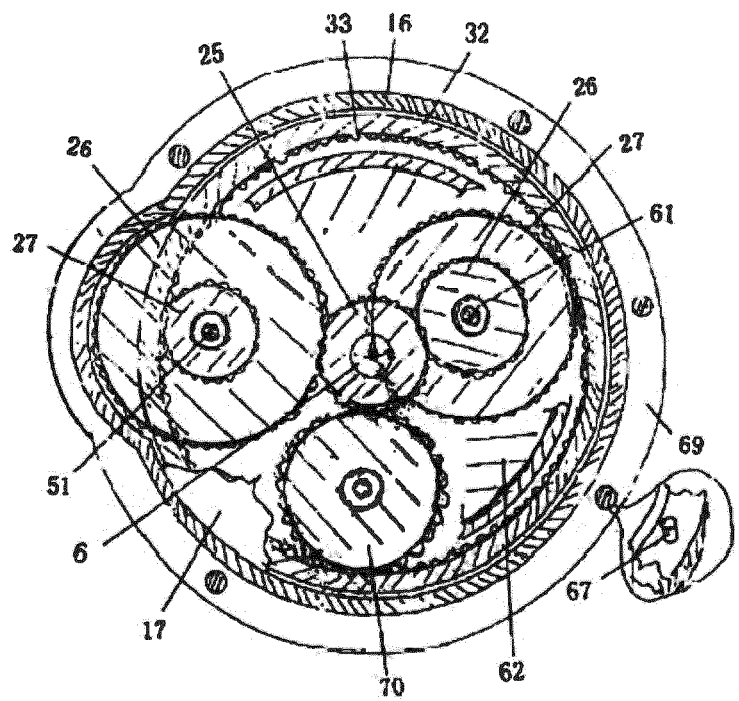
FIG. 5 is a circular sectional view of the engagement between the driving gear and the transmission gear in the transmission of an electric tricycle according to the first embodiment.

As shown in FIGS. 2 and 3, the top end of the output shaft 41 extends into the bearing 5 at the center of the fixed disc 29, and a bearing 5 and an overrunning clutch 35 are provided between the outer edge of the output shaft 41 and the center of the rotary disc 32. A compression spring 36 and an engagement disc 37 are provided on the output shaft 41 at one side of the overrunning clutch 35. An output gear 42 is provided on the bottom end of the output shaft 41, and the output gear 42 is arranged in the differential case 44 and is engaged with an idle gear 64 and a driven gear 49 in the differential case 44 sequentially. The bottom end of the output shaft 41 extends into the bearing 5 on the outer side surface 46, of differential A self-retaining electromagnet 53 and an end cap 50 of oil seal are provided on the outer side surface of differential 46, an electromagnet push-pull rod 66 is provided in the self-retaining electromagnet 53, and the self-retaining electromagnet 53 is arranged on the outer side surface 46 of differential at the bottom end of the output shaft 41. The output shaft 41 is arranged with a cross flat hole 90 and keys 40, two keys crossing with the cross flat hole are usually provided, and the engagement disc 37 is cup jointed with the output shaft 41 via the keys 40. Steel balls 51 and an ejector pin 52 are provided in the central part of the bottom end of the output shaft 41. A pin shaft 39 fitted with the cross flat hole 90 is provided on the top end of the engagement disc 37. One side of the inner circle of the rotary disc 32 is disengaged from or engaged with the engagement disc 37, external teeth 34 to be engaged are provided on one side of the rotary disc, and internal teeth 38 to be engaged are provided in the engagement disc. Bearings 5 are provided between the both ends of the idle gear shaft 65 and the inner side surface 45 of differential and outer side surface 46 of differential.

In actual applications, the application of an overrunning clutch is equivalent to neutral taxiing. A multi-shaft transmission can't achieve gear shift without a clutch. The cylindrical transmission in this embodiment is proven to be able to achieve gear shift without clutch. In conjunction with the application of an overrunning clutch, the cylindrical transmission in this embodiment can achieve smooth and steady gear shift of an electric automobile during travelling, and can increase the taxiing distance, improve efficiency and save energy. With an existing transmission in the prior art, once the driver release the power pedal, the vehicle will be decelerated immediately, because there is a great retardation effect on the vehicle from the wheels to the transmission and then to the engine, which not only results in energy waste, but also causes unwanted engine fatigue and decreased efficiency. On an electric vehicle utilizing the cylindrical transmission in this embodiment, when the driver releases the power pedal, the vehicle will not drive along with the motor; thus, gear shift can be accomplished successfully with the transmission in a still state, and the vehicle travels normally. As a result, the efficiency is improved, and motor fatigue is reduced. Once the driver brakes, the self-retaining electromagnet will be energized, the engagement disc will be engaged with the rotary disc, and thereby the motor or engine will create a retardation effect on the vehicle to decelerate the vehicle. Without application of a clutch, the cylindrical transmission in this embodiment can save lots of costs, and can avoid frequent and tedious operation of the clutch pedal.

Figure 8:
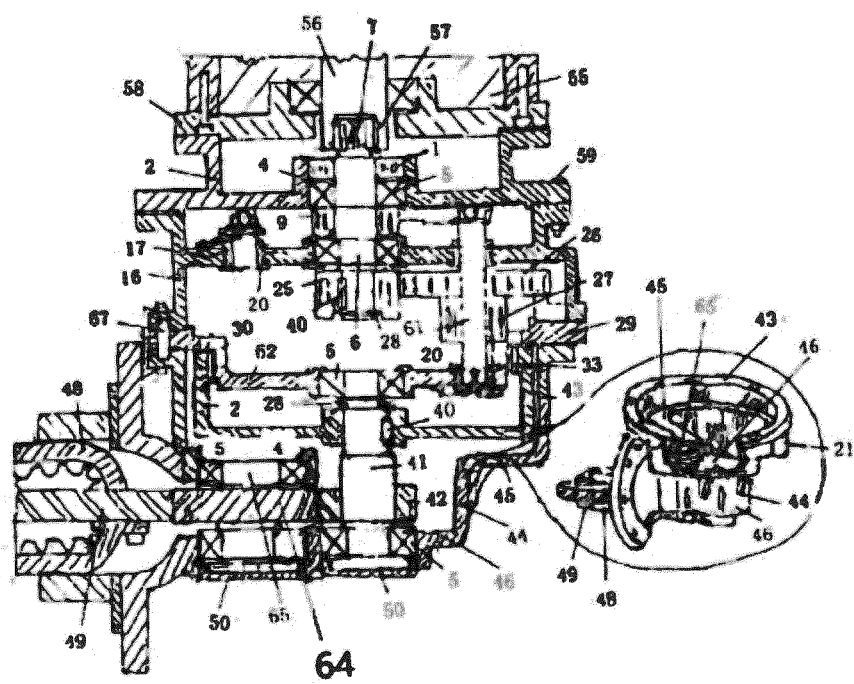
FIG. 8 is a cross sectional view of the cylindrical transmission connected with a differential on an electric tricycle without overrunning clutch according to the first embodiment.

As shown in FIG. 8, the center of the rotary disc 32 is fixed to the output shaft 41, and the top end of the output shaft 41 extends into the bearing 5 at the center of the fixed disc 29. An output gear 42 is provided on the bottom end of the output shaft 41, and the output gear 42 is arranged in the differential case 44 and is engaged with an idle gear 64 and a driven gear 49 in the differential case 44 sequentially. The bottom end of the output shaft 41 extends into the bearing 5 on the outer side surface 46 of differential. An end cap 50 of oil seal is provided on the outer side surface 46 of differential. Bearings 5 are provided between the both ends of the idle gear shaft 65 and the inner side surface 45 of differential and outer side surface 46 of differential.

Figure 6:
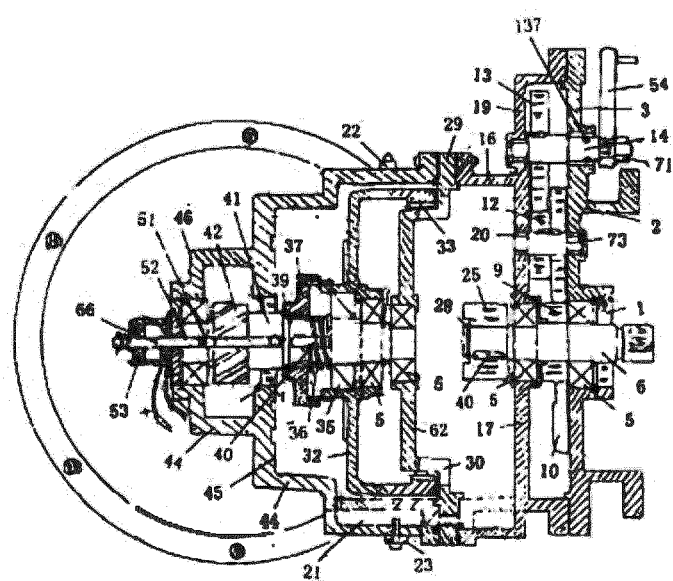
FIG. 6 is a vertical sectional view of the cylindrical transmission connected with a differential on an electric tricycle with an overrunning clutch according to the first embodiment.

As shown in FIGS. 2 and 6, a shift gear bushing 9, a duplex intermediate shift gear 12, an outer shift gear 13, an outer shift gear shaft 14, a gear press plate 10 and a gear pull plate 54 are provided between the front end cover 2 of transmission and the internal flat surface 17 of H-disc. The gear press plate 10 is fixed to the shift gear bushing 9, and has a bevel 11. The shift gear bushing 9 is arranged on the outer edge of the input shaft 6, a spacing ring 15 is provided at the center of the H-disc below the shift gear bushing, and the duplex intermediate shift gear 12 is engaged with the shift gear bushing 9 and the outer shift gear 13 respectively. The outer shift gear 13 is fixed to the outer shift gear shaft 14, and the outer shift gear shaft 14 extends out of the front end cover 2 of transmission. The gear pull plate 54 is fixed to one end of the outer shift gear shaft 14.

Figure 9:
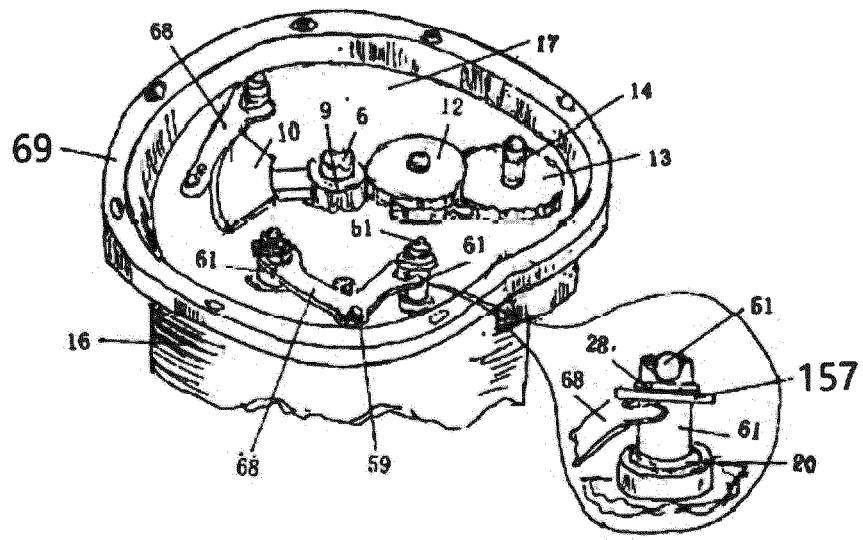
FIG. 9 is a schematic view of the leaf springs provided on the internal flat surface of an H-disc according to the first embodiment.
Figure 10:
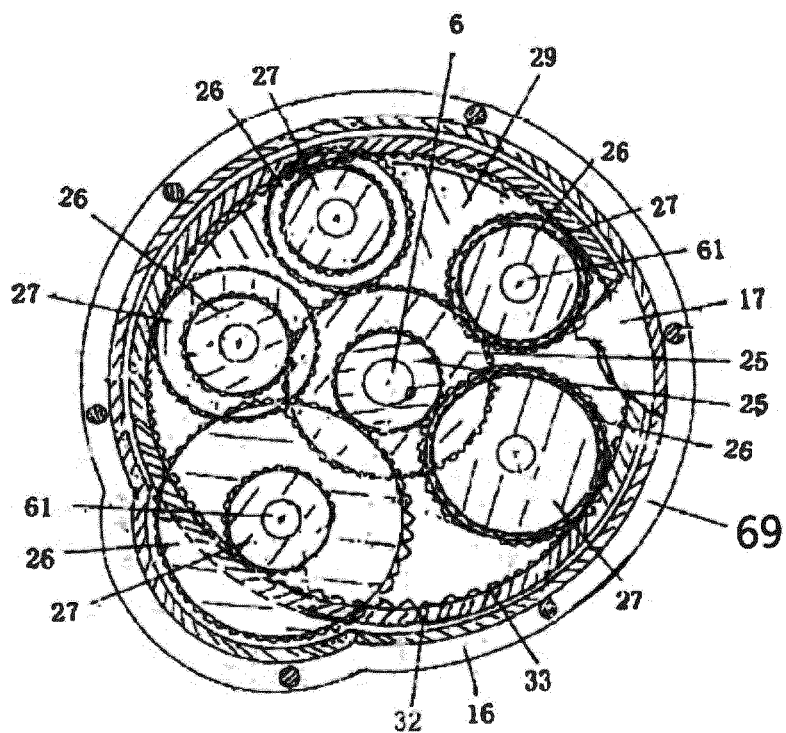
FIG. 10 is a schematic view illustrating the gear engagement in the transmission of an automobile according to a second embodiment.

As shown in FIG. 9, steel balls 51 are provided in the top end of the transmission gear shaft 61, and a copper washer 157 and a circlip 28 for shaft are provided on the upper part of the transmission gear shaft 61. The transmission gear shaft 61 extends upward through the internal flat surface 17 of H-disc. Several leaf springs 68 and a screw rod 59 are provided on the internal flat surface 17 of H-disc. The leaf springs 68 are fixed to the internal flat surface 17 of H-disc via the screw rod 59. The leaf springs 68 are arranged below the copper washer 157.

Figure 45:
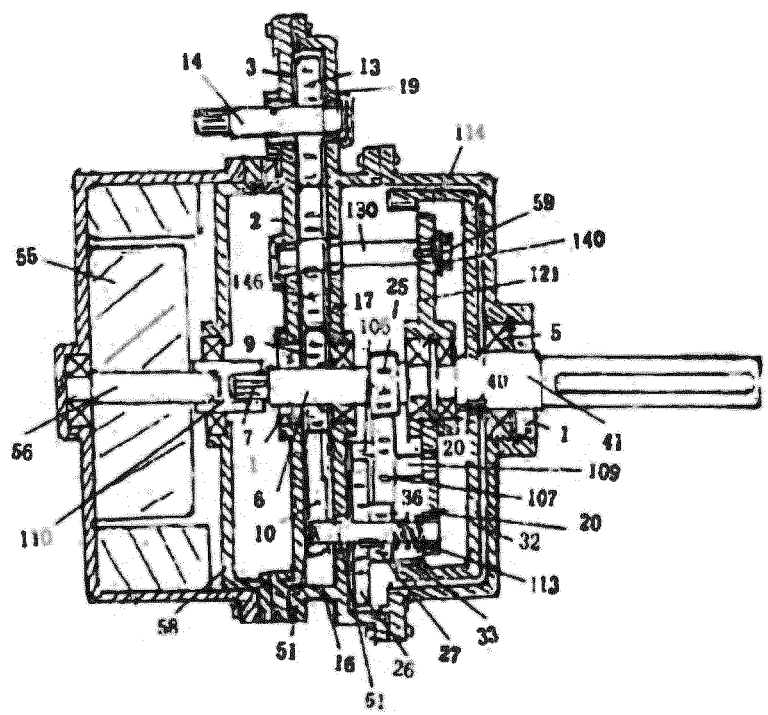
FIG. 45 is a structural sectional view of the transmission with an intermediate gear according to a fifth embodiment.

As shown in FIG. 45, a shift gear bushing 9, a shift intermediate single gear 146, an outer shift gear 13, an outer shift gear shaft 14, and a gear press plate 10 are provided between the front end cover 2 of transmission and the internal flat surface 17 of H-disc. The gear press plate 10 is fixed to the shift gear bushing 9, and has a bevel 11. The shift gear bushing 9 is arranged on the outer edge of the input shaft 6, and the shift intermediate single gear 146 is engaged with the shift gear bushing 9 and the outer shift gear 13 respectively. The outer shift gear 13 is fixed to the outer shift gear shaft 14 which extends out of the front end cover 2 of transmission.

Figure 23:
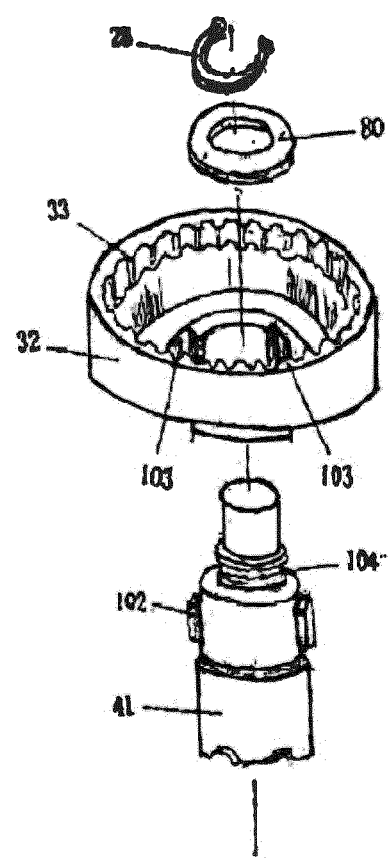
FIG. 23 is a component view of the flexible connection between the center of the rotary disc and the output shaft according to the second embodiment.

As shown in FIGS. 51, 47 and 32, an extension bushing 116 is provided on the driving gear 25, and an internal spline 57 is provided in the extension bushing 116. The extension bushing 116 extends through the solid lubricant embedded bearing 20 at the center of the H-disc 16, and a circlip 28 for shaft is provided on the end of the extension bushing 116. An external spline 7 is provided on the end of the input shaft 6. The input shaft 6 extends through a driving shaft tube 117 of an external driving device, and then extends into the center of the H-disc 16 and the extension bushing 116. As shown in FIGS. 17 and 18, a first groove 103 is provided in the inner circle of the driving gear 25, a first cross flat hole 90 is provided in the input shaft 6 in the inner circle of the driving gear 25, and a first shift plate 102 is provided in the first cross flat hole 90. The first groove 103 is fitted into the outer edge of the first shift plate 102, and a first plain washer 80 and a first circlip 28 for shaft are provided on the upper side of the driving gear 25. As shown in FIG. 19, a second groove 103 is provided in the inner circle of the transmission gear upper wheel 26, a second cross flat hole 90 is provided in the transmission gear shaft 61 in the inner circle of the transmission gear upper wheel 26, and a second shift plate 102 is provided in the second cross flat hole 90. The second groove 103 is fitted into the outer edge of the second shift plate 102, and a second plain washer 80 and a second circlip 28 for shaft are provided on the upper side of the transmission gear upper wheel 26. As shown in FIG. 20, a third groove 103 is provided in the inner circle of the transmission gear bottom wheel 27, a third cross flat hole 90 is provided in the transmission gear shaft 61 in the inner circle of the transmission gear bottom wheel 27, and a third shift plate 102 is provided in the third cross flat hole 90. The third groove 103 is fitted into the outer edge of the third shift plate 102, and a third plain washer 80 and a third circlip 28 for shaft are provided on the lower side of the transmission gear bottom wheel 27. As shown in FIGS. 22 and 23, a fourth groove 103 is provided in the inner circle of the center of the rotary disc 32, a fourth cross flat hole 90 is provided on the output shaft 41 at the center of the rotary disc 32, and a fourth shift plate 102 is provided in the fourth cross flat hole 90. The fourth groove 103 is fitted into the outer edge of the fourth shift plate 102, and a fourth plain washer 80 and a fourth circlip 28 for shaft are provided on the inner side of the rotary disc 32 on the output shaft 41.

Alternatively, as shown in FIG. 21, a second groove 103 is provided in the inner circle of the transmission gear upper wheel 26, two opposite fourth shift plate 102 are provided on the transmission gear shaft 61 in the center of the inner circle of the transmission gear upper wheel 26, and the second groove 103 is fitted into the outer edges of the two fourth shift plates 102. A second plain washer 80 and a second circlip 28 for shaft are provided on the upper side of the transmission gear upper wheel 26.

In the cylindrical transmission in this embodiment, the gear shaft may further include an intermediate gear shaft 109; the gear further includes an intermediate gear upper wheel 106 and an intermediate gear bottom wheel 107; furthermore, the gears may further include a reverse gear 100, and a gear shift control device is provided at one side of the reverse gear 100. A synchronizer 144 is provided between two adjacent transmission gear upper wheels. The specific structural features of the intermediate gear shaft 109, intermediate gear upper wheels 106, intermediate gear bottom wheels 107, reverse gear 100, gear shift control device and synchronizer 144 are described in the embodiment 1 of the description.

The cylindrical transmission in this embodiment is in a multi-gear design. Existing multi-shaft transmissions can only achieve gear shift on one shaft except the input shaft. In contrast, the cylindrical transmission in this embodiment can achieve gear shift on multiple shafts; specifically, several shafts can be provided in the periphery of the input shaft, and a plurality of transmission gear upper wheels can be designed on each of the shafts, so as to realize multiple gear positions and transfer the power via the rotary disc respectively. For example, four transmission gear upper wheels can be arranged on each shaft, and four shafts can be arranged on the periphery of the input shaft. Thus, 16 gear positions and different outputs can be realized in a small space.

Embodiment 3

Figure 33:
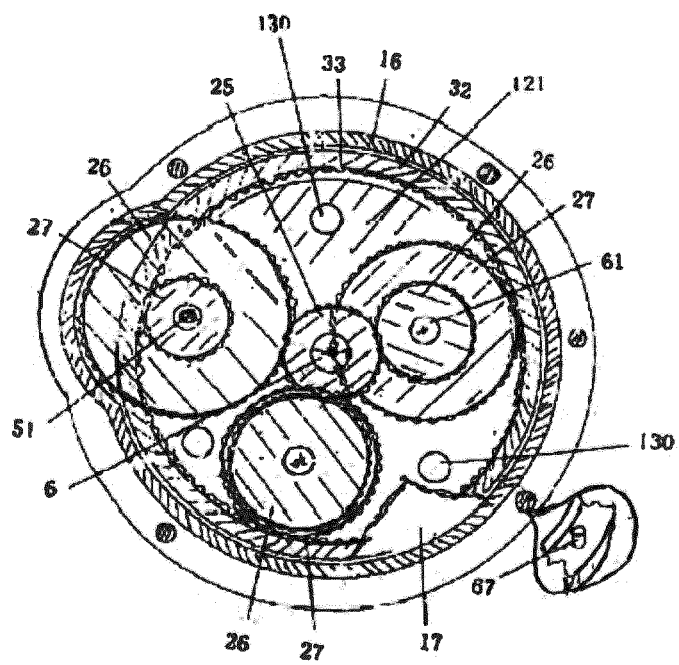
FIG. 33 is a circular sectional view of the transmission with a fixed flat disc according to the third embodiment.

As shown in FIGS. 32 and 33, in the cylindrical transmission of this embodiment, the several circular discs include H-disc 16, fixed flat disc 121, and rear end cover 114 of transmission. The gear shafts include a transmission gear shaft 61. The gears include a transmission gear upper wheel 26, a transmission gear bottom wheel 27, and a transmission single gear 70. Several fixed columns 130 are provided on the internal flat surface 17 of H-disc and the fixed flat disc 121, several bearing sockets 119 corresponding to the fixed columns 130 are provided on the internal flat surface 17 of H-disc and the fixed flat disc 121, and solid lubricant embedded bearings 20 are provided in the bearing sockets 119. Driving gears 25 are provided on the outer edge of the input shaft 6 between the H-disc 16 and the fixed flat disc 121, the transmission gear upper wheel 26 and the transmission gear bottom wheel 27 are fixed to the transmission gear shaft 61, and steel balls 51 are provided in the top end of the transmission gear shaft 61. The transmission gear shaft 61 extends upward through the internal flat surface 17 of H-disc. A compression spring 36 is provided below the transmission gear bottom wheel 27. The bottom of the transmission gear shaft 61 extends into an outer flange copper bushing 113 in the fixed flat disc 121, the outer flange copper bushing 113 is arranged in the solid lubricant embedded bearing 20 in the fixed flat disc 121, and the fixed flat disc 121 is arranged below the internal teeth 33 of rotary disc. The driving gears 25 are engaged with the transmission gear upper wheel 26, the transmission gear bottom wheel 27 is adjacent to the internal teeth 33 of rotary disc, with clearance arranged between them, and the transmission gear bottom wheel 27 is disengaged from or engaged with the internal teeth 33 of rotary disc. An outside lip 69 of the H-disc 16 is connected to an outside lip 69 of the rear end cover 114 of transmission. The center of the rotary disc 32 is fixed to the output shaft 41, one end of the output shaft 41 extends into the bearing 5 at the center of the fixed flat disc 121, and the other end of the output shaft 41 extends through the bearing 5 and oil seal 1 in the rear end cover 114 of transmission.

Figure 34:
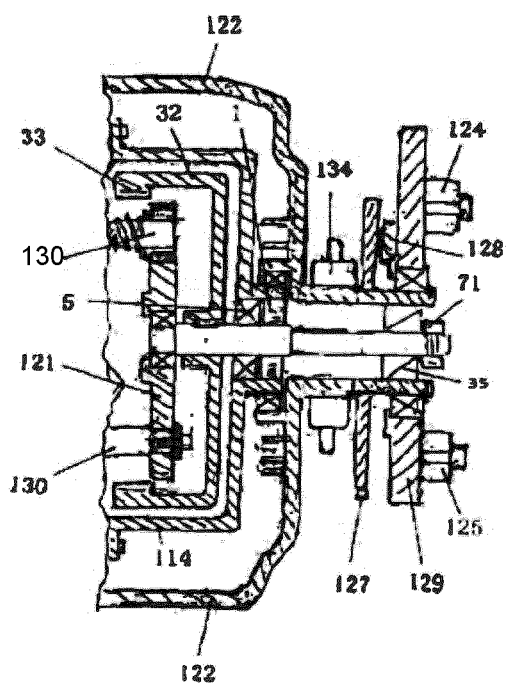
FIG. 34 is a sectional view of the rear wheel drive transmission with a chain wheel on an electric scooter according to the third embodiment.
Figure 35:
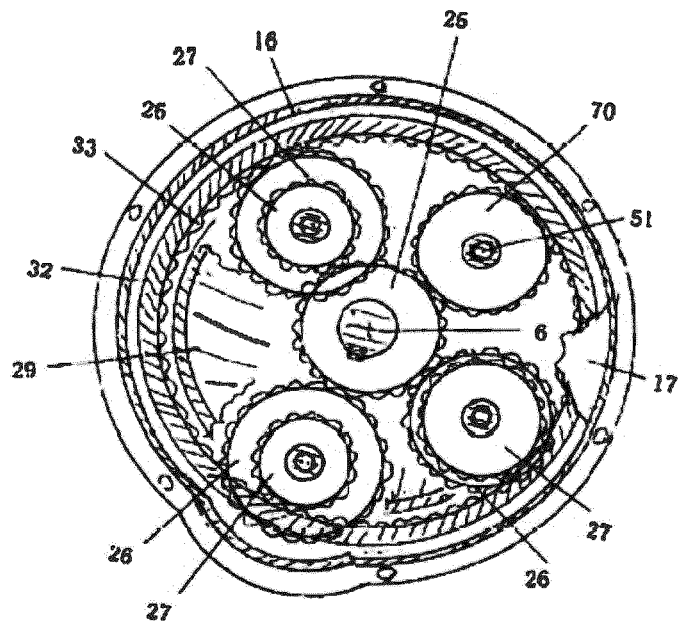
FIG. 35 is a circular sectional view of the four-speed transmission according to the third embodiment.

As shown in FIGS. 32, 34 and 35, the outer end of the output shaft 41 extends through the rear end cover 114 of transmission and an overrunning clutch 35 at the center of a hub disc 122. A nut 71 and a thrust gasket 140 are provided on the outer end of the output shaft 41. A bearing 5 is provided between the center of the hub disc 122 and the outer edge of one side of the rear end cover 114 of transmission.

As shown in FIGS. 51, 47 and 32, an extension bushing 116 is provided on the driving gear 25, and an internal spline 57 is provided in the extension bushing 116. The extension bushing 116 extends through the solid lubricant embedded bearing 20 at the center of the H-disc 16, and a circlip 28 for shaft is provided on the end of the extension bushing 116. An external spline 7 is provided on the end of the input shaft 6. The input shaft 6 extends through a driving shaft tube 117 of an external driving device, and then extends into the center of the H-disc 16 and the extension bushing 116. As shown in FIGS. 17 and 18, a first groove 103 is provided in the inner circle of the driving gear 25, a first cross flat hole 90 is provided on the input shaft 6 in the inner circle of the driving gear 25, and a first shift plate 102 is provided in the first cross flat hole 90. The first groove 103 is fitted into the outer edge of the first shift plate 102, and a first plain washer 80 and a first circlip 28 for shaft are provided on the upper side of the driving gear 25. As shown in FIG. 19, a second groove 103 is provided in the inner circle of the transmission gear upper wheel 26, a second cross flat hole 90 is provided on the transmission gear shaft 61 in the inner circle of the transmission gear upper wheel 26, and a second shift plate 102 is provided in the second cross flat hole 90. The second groove 103 is fitted into the outer edge of the second shift plate 102, and a second plain washer 80 and a second circlip 28 for shaft are provided on the upper side of the transmission gear upper wheel 26. As shown in FIG. 20, a third groove 103 is provided on the inner circle of the transmission gear bottom wheel 27, a third cross flat hole 90 is provided in the transmission gear shaft 61 in the inner circle of the transmission gear bottom wheel 27, and a third shift plate 102 is provided in the third cross flat hole 90. The third groove 103 is fitted into the outer edge of the third shift plate 102, and a third plain washer 80 and a third circlip 28 for shaft are provided on the lower side of the transmission gear bottom wheel 27. As shown in FIGS. 22 and 23, a fourth groove 103 is provided in the inner circle of the center of the rotary disc 32, a fourth cross flat hole 90 is provided on the output shaft 41 in the center of the rotary disc 32, and a fourth shift plate 102 is provided in the fourth cross flat hole 90. The fourth groove 103 is fitted into the outer edge of the fourth shift plate 102, and a fourth plain washer 80 and a fourth circlip 28 for shaft are provided on the inner side of the rotary disc 32 on the output shaft 41.

Alternatively, as shown in FIG. 21, a second groove 103 is provided in the inner circle of the transmission gear upper wheel 26, two opposite fourth shift plates 102 are provided on the transmission gear shaft 61 in the center of the inner circle of the transmission gear upper wheel 26, and the second groove 103 is fitted into the outer edges of the two fourth shift plates 102. A second plain washer 80 and a second circlip 28 for shaft are provided on the upper side of the transmission gear upper wheel 26.

The cylindrical transmission in this embodiment may be arranged in the rear wheel drive device of an electric scooter, so that the electric scooter can generate high torque with a high-speed motor to obtain great starting force and acceleration. There is no appropriate mounting position in the rear wheel drive device of the electric scooter for an existing transmission, and the rear wheel drive unit can not achieve a high speed reduction ratio. In contrast, since the input shaft and the output shaft in the cylindrical transmission of this embodiment are in the same center line, there is a mounting position for the cylindrical transmission in the rear wheel drive device, and the rear wheel drive unit can achieve a high speed reduction ratio.

Example 4

Figure 46:
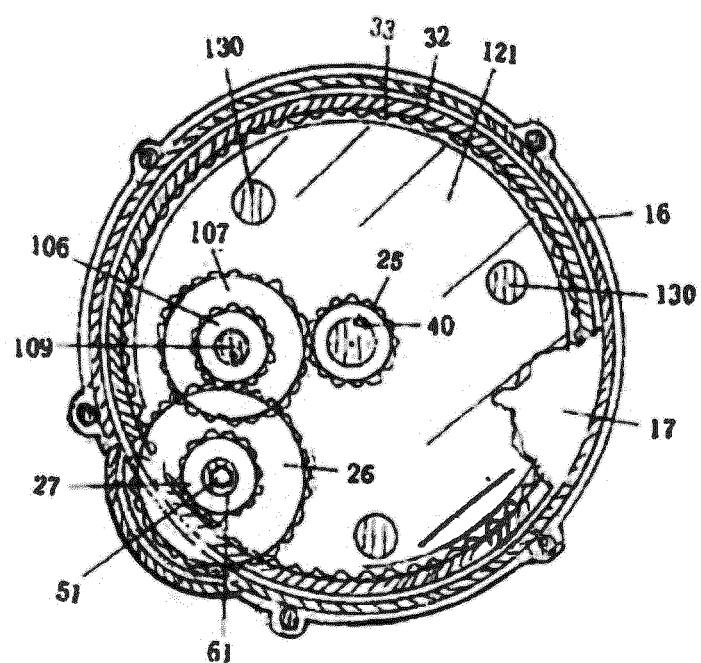
FIG. 46 is a circular sectional view of the transmission with an intermediate gear according to the fifth embodiment.

As shown in FIGS. 45 and 46, in the cylindrical transmission of this embodiment, the several circular discs include front end cover 2 of transmission, H-disc 16, fixed flat disc 121, and rear end cover 114 of transmission. The internal flat surface 17 of H-disc and the fixed flat disc 121 have several corresponding bearing sockets 119, and solid lubricant embedded bearings 20 are provided in the bearing sockets 119. The gear shafts include intermediate gear shaft 109 and transmission gear shaft 61. The gears include intermediate gear upper wheels 106, intermediate gear bottom wheels 107, transmission gear upper wheels 26 and transmission gear bottom wheels 27. The driving gears 25 are fixed to the input shaft 6 between the internal flat surface 17 of H-disc and the fixed flat disc 121. Two bearings 5 are provided at the center of the fixed flat disc 121. One end of the input shaft 6 extends into one bearing 5 at the center of the fixed flat disc 121. The other end of the input shaft 6 extends through the bearing 5 at the center of the H-disc 16 and the oil seal 1 at the center of the front end cover 2 of transmission sequentially. The center of the rotary disc 32 is fixed to the output shaft 41, one end of the output shaft 41 extends into the other bearing 5 at the center of the fixed flat disc 121, and the other end of the output shaft 41 extends through the bearing 5 and oil seal 1 in the rear end cover 114 of transmission. The intermediate gear upper wheel 106 and the intermediate gear bottom wheel 107 are fixed to the intermediate gear shaft 109, and the transmission gear upper wheel 26 and the transmission gear bottom wheel 27 are fixed to the transmission gear shaft 61. The driving gears 25 are engaged with the intermediate gear upper wheel 106 or the intermediate gear bottom wheel 107, and the intermediate gear upper wheel 106 or the intermediate gear bottom wheel 107 is engaged with the transmission gear upper wheel 26. Steel balls 51 are provided in the top end of the transmission gear shaft 61, and the top end of the transmission gear shaft 61 extends through the solid lubricant embedded bearing 20 in the internal flat surface 17 of H-disc and is located below the front end cover 2 of transmission. A compression spring 36 is provided on the outer edge of the bottom end of the transmission gear shaft 61, the bottom end of the transmission gear shaft 61 extends into an outer flange copper bushing 113 in the fixed flat disc 121, and the outer flange copper bushing 113 is arranged in the solid lubricant embedded bearing 20 of the fixed flat disc 121. Several fixed columns 130 are provided between the H-disc 16 and the fixed flat disc 121.

It should be noted that in actual applications, the fixed flat disc and the fixed disc are interchangeable as required.

As shown in FIG. 24 or 45, the gears further include an intermediate single gear 108. The intermediate single gear 108 is arranged between the internal flat surface 17 of H-disc and the internal flat surface 62 of fixed disc or the fixed flat disc 121. The driving gears 25 are engaged with the intermediate single gear 108, the intermediate single gear 108 is engaged with the transmission gear upper wheel 26, and the transmission gear bottom wheel 27 is disengaged from or engaged with the internal teeth 33 of rotary disc.

As shown in FIG. 24 or 45, the gears further include a transmission single gear 70. The transmission single gear 70 is arranged between the internal flat surface 17 of H-disc and the internal flat surface 62 of fixed disc or the fixed flat disc 121. The intermediate gear upper wheel 106 or intermediate gear bottom wheel 107 is engaged with the transmission single gear 70. The transmission single gear 70 is disengaged from or engaged with the internal teeth 33 of rotary disc.

As shown in FIGS. 27, 28, 29, 30, 32, 47 and 51, an extension bushing 116 is provided on the driving gear 25, and an internal spline 57 is provided in the extension bushing 116. The extension bushing 116 extends through the solid lubricant embedded bearing 20 at the center of the H-disc 16, and a circlip 28 for shaft is provided on the end of the extension bushing 116. An external spline 7 is provided on the end of the input shaft 6. The input shaft 6 extends through a driving shaft tube 117 of an external driving device, and then extends into the extension bushing 116 at the center of the H-disc 16. As shown in FIGS. 17 and 18, a first groove 103 is provided in the inner circle of the driving gear 25, a first cross flat hole 90 is provided in the input shaft 6 in the inner circle of the driving gear 25, and a first shift plate 102 is provided in the first cross flat hole 90. The first groove 103 is fitted into the outer edge of the first shift plate 102, and a first plain washer 80 and a first circlip 28 for shaft are provided on the upper side of the driving gear 25. As shown in FIG. 19, a second groove 103 is provided in the inner circle of the transmission gear upper wheel 26, a second cross flat hole 90 is provided in the transmission gear shaft 61 in the inner circle of the transmission gear upper wheel 26, and a second shift plate 102 is provided in the second cross flat hole 90. The second groove 103 is fitted into the outer edge of the second shift plate 102, and a second plain washer 80 and a second circlip 28 for shaft are provided on the upper side of the transmission gear upper wheel 26. As shown in FIG. 20, a third groove 103 is provided in the inner circle of the transmission gear bottom wheel 27, a third cross flat hole 90 is provided in the transmission gear shaft 61 in the center of the inner circle of the transmission gear bottom wheel 27, and a third shift plate 102 is provided in the third cross flat hole 90. The third groove 103 is fitted into the outer edge of the third shift plate 102, and a third plain washer 80 and a third circlip 28 for shaft are provided on the lower side of the transmission gear bottom wheel 27. As shown in FIGS. 22 and 23, a fourth groove 103 is provided in the inner circle of the center of the rotary disc 32, a fourth cross flat hole 90 is provided in the output shaft 41 in the center of the rotary disc 32, and a fourth shift plate 102 is provided in the fourth cross flat hole 90. The fourth groove 103 is fitted into the outer edge of the fourth shift plate 102, and a fourth plain washer 80 and a fourth circlip 28 for shaft are provided on the inner side of the rotary disc 32 fitted on the output shaft 41.

Alternatively, as shown in FIG. 21, a second groove 103 is provided in the inner circle of the transmission gear upper wheel 26, two opposite fourth shift plates 102 are provided on the transmission gear shaft 61 in the center of the inner circle of the transmission gear upper wheel 26, and the second groove 103 is fitted into the outer edges of the two fourth shift plates 102. A second plain washer 80 and a second circlip 28 for shaft are provided on the upper side of the transmission gear upper wheel 26.

The cylindrical transmission in this embodiment can achieve a high speed reduction ratio or speed-up ratio. For example, suppose the speed reduction ratio of the driving gear to the internal teeth of rotary disc is 7:1, the speed reduction ratio of the intermediate gear is 3:1 and the speed reduction ratio of the transmission gear is 3:1, the total speed reduction ratio of the input shaft to the output shaft is 7*3*3=63; under the same size, planetary reducers can achieve a speed reduction ratio up to 6-7 at the most; in contrast, the cylindrical transmission in this embodiment can achieve a much higher speed reduction ratio, which can not be achieved by any other existing transmission in the art. Therefore, the cylindrical transmission in this embodiment is especially suitable for achieving a high speed reduction ratio required for high-speed motors. In the beginning, people believe that a transmission is not required for electric automobiles; however, now they have recognized that an electric automobile can not operate normally without a transmission. There is no suitable transmission for electric automobile yet at present. The cylindrical transmission in this embodiment can fully fill the gap.

Example 5

Figure 37:
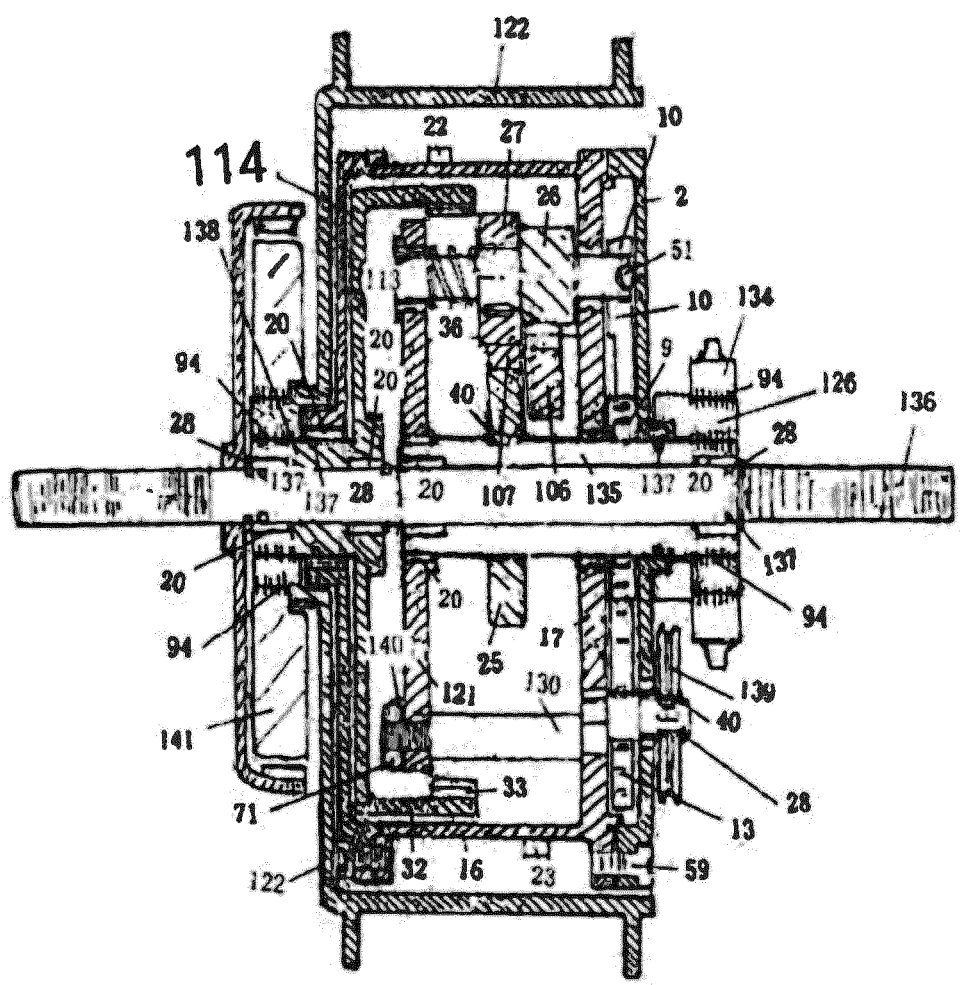
FIG. 37 is a structural sectional view of the rear transmission on a bicycle according to a fourth embodiment.

As shown in FIG. 37, in the cylindrical transmission of this embodiment, the several circular discs include front end cover 2 of transmission, H-disc 16, fixed flat disc 121, and rear end cover 114 of transmission. The front end cover 2 of transmission, H-disc 16, and fixed flat disc 121 are cup jointed on the outer edge of the input shaft 6, and the input shaft 6 is a hollow shaft, equivalent to an input shaft tube 135. Solid lubricant embedded bearings 20 are provided at the center of the input shaft 6 and the output shaft 41. A connecting ring 126 is provided on the outer end of the input shaft 6, a chain wheel 134 is provided on the outer edge of the connecting ring 126, and solid lubricant embedded bearings 20 are provided between the H-disc 16 and the input shaft 6 and between the fixed flat disc 121 and the input shaft 6 respectively. An O-oil seal 137 is provided between the front end cover 2 of transmission and the input shaft 6. The rotary disc 32 and the output shaft 41 constitute an integral structure. The outer end of the output shaft 41 extends through the rear end cover 114 of transmission, and the output shaft 41 is a hollow shaft, equivalent to an output shaft tube 138. A solid lubricant embedded bearing 20 and an O-oil seal 137 are provided between the rear end cover 114 of transmission and the output shaft 41, and a hub disc 122 is provided on the outer edge of the output shaft 41. One side of the H-disc 16 is connected to the front end cover 2 of transmission, and the other side of the H-disc 16 is connected to the rear end cover 114 of transmission. Several fixed columns 130 are provided between the H-disc 16 and the fixed flat disc 121.

As shown in FIG. 37, a shift gear bushing 9, an outer shift gear 13, an outer shift gear shaft 14, a gear press plate 10, and a grooved wheel 139 are provided between the front end cover 2 of transmission and the internal flat surface 17 of H-disc. The gear press plate 10 is fixed to the shift gear bushing 9, and has a bevel 11. The shift gear bushing 9 is arranged on the outer edge of the input shaft 6, and the shift gear bushing 9 is engaged with the outer shift gear 13. The outer shift gear 13 is fixed to the outer shift gear shaft 14, and the outer shift gear shaft 14 extends out of the front end cover 2 of transmission. The grooved wheel 139 is fixed to one end of the outer shift gear shaft 14.

Figure 36:
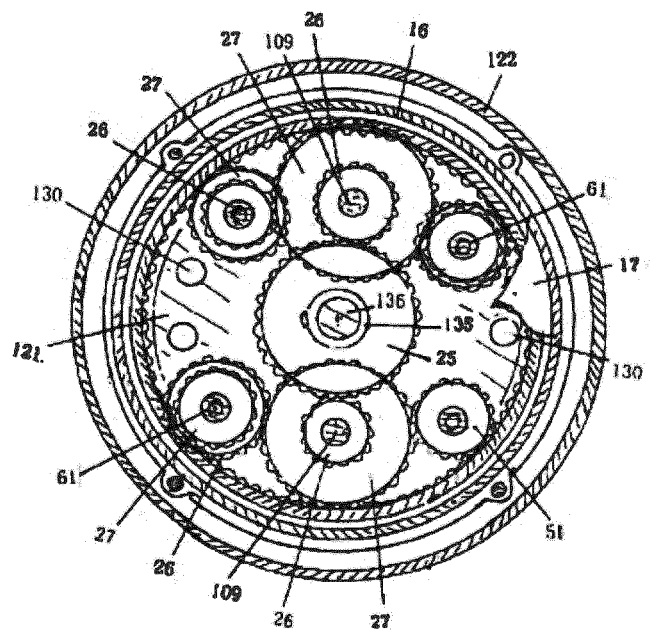
FIG. 36 is a circular sectional view of the rear transmission on a bicycle according to the third embodiment.

As shown in FIGS. 36 and 37, the internal flat surface 17 of H-disc and the fixed flat disc 121 have several corresponding bearing sockets 119, and solid lubricant embedded bearings 20 are provided in the bearing sockets 119. The gear shafts include intermediate gear shaft 109 and transmission gear shaft 61. The gears include an intermediate gear upper wheel 106, an intermediate gear bottom wheel 107, a transmission gear upper wheel 26 and a transmission gear bottom wheel 27. The driving gears 25 are fixed to the input shaft 6 between the internal flat surface 17 of H-disc and the fixed flat disc 121. The center of the rotary disc 32 is fixed to the output shaft 41. The intermediate gear upper wheel 106 and the intermediate gear bottom wheel 107 are fixed to the intermediate gear shaft 109, and the transmission gear upper wheel 26 and the transmission gear bottom wheel 27 are fixed to the transmission gear shaft 61. The driving gears 25 are engaged with the intermediate gear upper wheel 106 or the intermediate gear bottom wheel 107, and the intermediate gear upper wheel 106 or intermediate gear bottom wheel 107 is engaged with the transmission gear upper wheel 26. Steel balls 51 are provided in the top end of the transmission gear shaft 61, and the top end of the transmission gear shaft 61 extends through the solid lubricant embedded bearing 20 in the internal flat surface 17 of H-disc and is located below the front end cover 2 of transmission. A compression spring 36 is provided on the outer edge of the bottom end of the transmission gear shaft 61, the bottom end of the transmission gear shaft 61 extends into an outer flange copper bushing 113 in the fixed flat disc 121, and the outer flange copper bushing 113 is arranged in the solid lubricant embedded bearing 20 of the fixed flat disc 121.

As shown in FIGS. 51, 47 and 32, an extension bushing 116 is provided on the driving gear 25, and an internal spline 57 is provided in the extension bushing 116. The extension bushing 116 extends through the solid lubricant embedded bearing 20 at the center of the H-disc 16, and a circlip 28 for shaft is provided on the end of the extension bushing 116. An external spline 7 is provided on the end of the input shaft 6. The input shaft 6 extends through a driving shaft tube 117 of an external driving device, and then extends into the center of the H-disc 16 and the extension bushing 116. As shown in FIGS. 17 and 18, a first groove 103 is provided in the inner circle of the driving gear 25, a first cross flat hole 90 is provided in the input shaft 6 in the inner circle of the driving gear 25, and a first shift plate 102 is provided in the first cross flat hole 90. The first groove 103 is fitted into the outer edge of the first shift plate 102, and a first plain washer 80 and a first circlip 28 for shaft are provided on the upper side of the driving gear 25. As shown in FIG. 19, a second groove 103 is provided in the inner circle of the transmission gear upper wheel 26, a second cross flat hole 90 is provided in the transmission gear shaft 61 in the inner circle of the transmission gear upper wheel 26, and a second shift plate 102 is provided in the second cross flat hole 90. The second groove 103 is fitted into the outer edge of the second shift plate 102, and a second plain washer 80 and a second circlip 28 for shaft are provided on the upper side of the transmission gear upper wheel 26. As shown in FIG. 20, a third groove 103 is provided in the inner circle of the transmission gear bottom wheel 27, a third cross flat hole 90 is provided in the transmission gear shaft 61 in the center of the inner circle of the transmission gear bottom wheel 27, and a third shift plate 102 is provided in the third cross flat hole 90. The third groove 103 is fitted into the outer edge of the third shift plate 102, and a third plain washer 80 and a third circlip 28 for shaft are provided on the lower side of the transmission gear bottom wheel 27. As shown in FIGS. 22 and 23, a fourth groove 103 is provided in the inner circle of the center of the rotary disc 32, a fourth cross flat hole 90 is provided in the output shaft 41 in the center of the rotary disc 32, and a fourth shift plate 102 is provided in the fourth cross flat hole 90. The fourth groove 103 is fitted into the outer edge of the fourth shift plate 102, and a fourth plain washer 80 and a fourth circlip 28 for shaft are provided on the inner side of the rotary disc 32 on the output shaft 41.

Alternatively, as shown in FIG. 21, a second groove 103 is provided in the inner circle of the transmission gear upper wheel 26, two opposite fourth shift plates 102 are provided on the transmission gear shaft 61 in the center of the inner circle of the transmission gear upper wheel 26, and the second groove 103 is fitted into the outer edges of the two fourth shift plates 102. A second plain washer 80 and a second circlip 28 for shaft are provided on the upper side of the transmission gear upper wheel 26. At present, a multi-layer chain drum is used for gear shift on most bicycles, but gear shift with a multi-layer chain drum may cause abrasion of the chain wheel and the chain easily and thereby may result in difficulties in gear shift. The input shaft and output shaft of the cylindrical transmission in this embodiment can be fitted over the rear axle of the bicycle and realize mechanical gear shift for the bicycle under a small volume. Such a gear shift mechanism has low costs, is difficult to damage gears, and can improve the application performance of a bicycle. The cylindrical transmission in this embodiment can be fitted over different shafts to accomplish mechanical gear shift and expand the scope of application.

Figure 7:
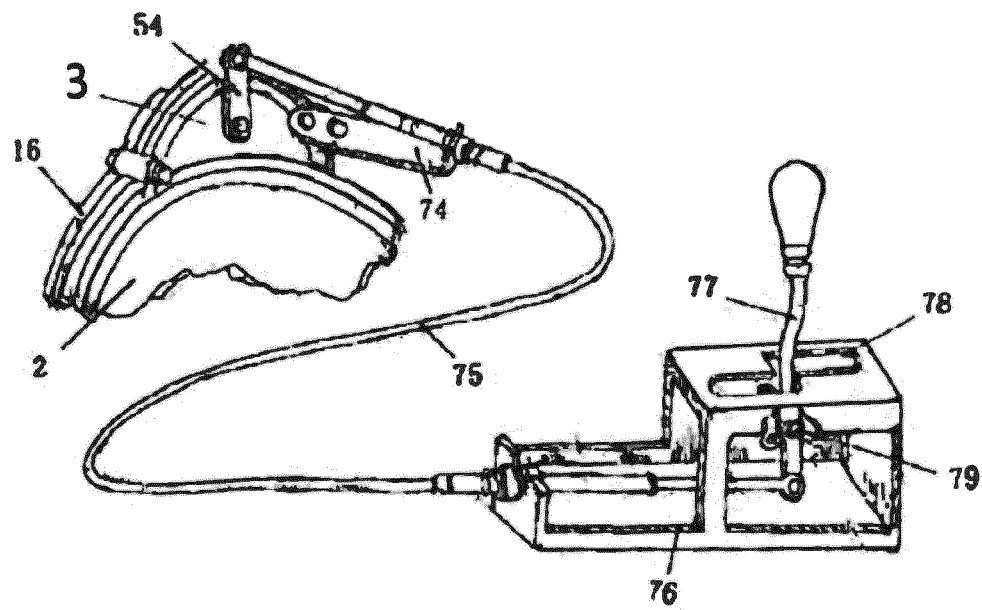
FIG. 7 is a schematic view of the manual gear shift device on the transmission of an electric tricycle according to the first embodiment.

FIG. 7 is a schematic view of a manual gear shift device of a transmission on an electric tricycle, wherein, one end of a shift pull plate 74 is fixed to the front end cover 2 of transmission, and the other end of the shift pull plate 74 is connected to one end of a shift pull wire 75; the other end of the shift pull wire 75 is connected to the bottom end of a shift lever 77 in a shifter case 76; a ball screw 79 is provided on the lower-middle part of the shift lever 77, and the ball screw 79 connects the shift lever to a side of the shifter case 76; a gear track groove 78 is provided on the shifter case 76.

Figure 44:
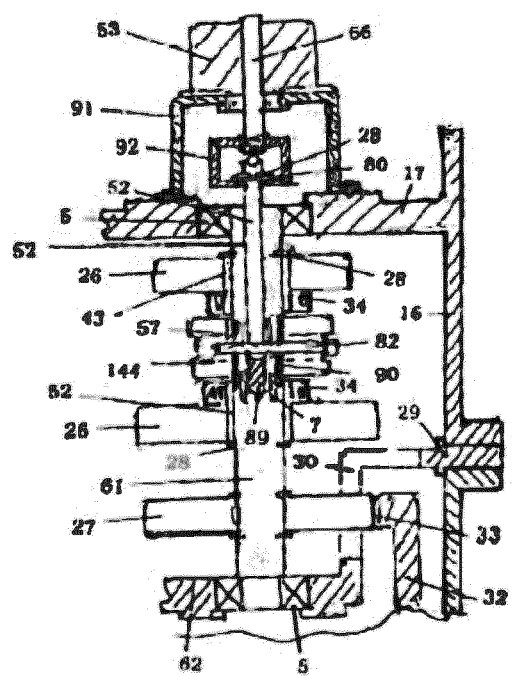
FIG. 44 is a view of the gear-shifting mode with a plurality of transmission gear upper wheels according to the fourth embodiment.

In actual applications, the above exemplary examples may also employ the following gear shift scheme: as shown in FIG. 44, several self-retaining electromagnets 53 are provided on the internal flat surface 17 of H-disc, the self-retaining electromagnets 53 are fixed to electromagnet bases 91, the electromagnet bases 91 are fixed to the internal flat surface 17 of H-disc, the electromagnet push-pull rod 66 in each self-retaining electromagnet 53 is connected to an electromagnet connector 92, a bayonet 159 in the electromagnet connector 92 is clamped at the bottom side of circlip 28 for shaft and copper washer 158 at the top end of an ejector pin 52 arranged at the center of the transmission gear shaft 61. The ejector pin 52 at the center of the transmission gear shaft 61 extends into the center of the transmission gear shaft 61. The transmission gear bottom wheel 27 is fixed to the lower end of the transmission gear shaft 61, and is engaged with the internal teeth 33 of rotary disc; a needle roller bearing 143 is provided between the transmission gear upper wheel 26 and the transmission gear shaft 61. A synchronizer 144 is provided between two adjacent transmission gear upper wheels 26, an internal spline 57 of the synchronizer is cup jointed over the outer edges of an external spline 7 arranged on the transmission gear shaft 61, a cross flat hole 90 is provided in the transmission gear shaft 61, and a dovetail screw 82 extends through the synchronizer 144 and an ejector pin 52 in cross direction in the cross flat hole.

Figure 49:
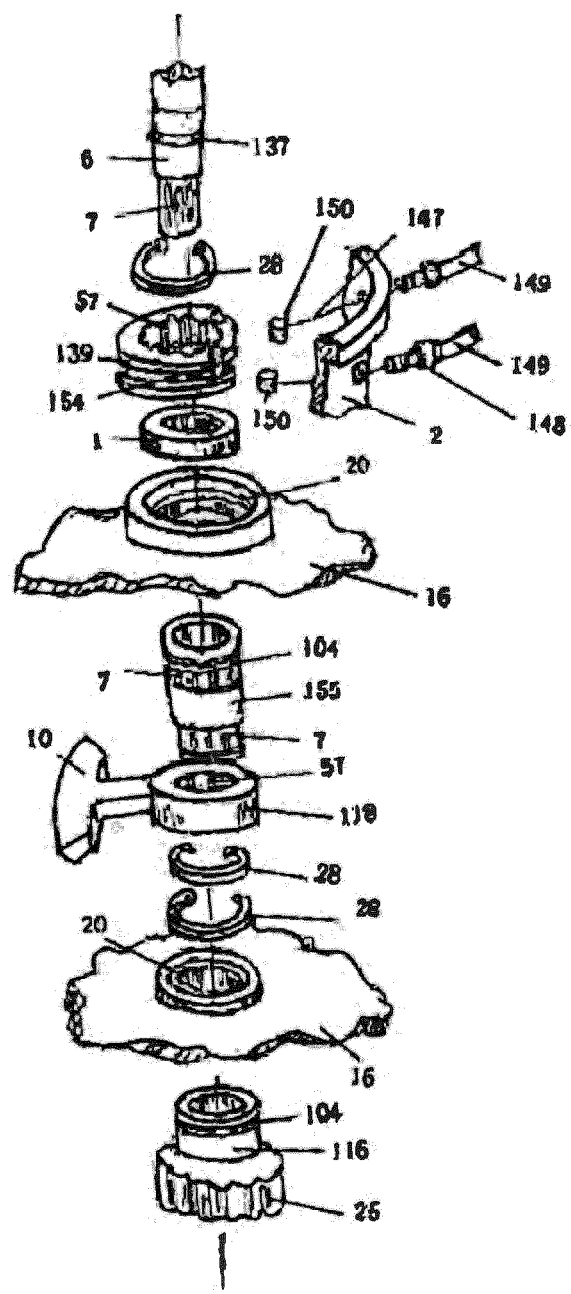
FIG. 49 is a component view of the grooved wheel for gear shift according to the fifth embodiment.

In actual applications, the above exemplary examples may also employ the following gear shift scheme: as shown in FIGS. 47 and 49, an extension bushing 116 is provided on the driving gear 25, and an internal spline 57 is provided in the extension bushing 116. The extension bushing 116 extends through the solid lubricant embedded bearing 20 in the H-disc 16, and the end of the extension bushing 116 is stopped by a circlip 28 for shaft. A gear press plate 10 is fixed to an internal spline ring 118, an internal spline 57 is provided in the internal spline ring 118, and external splines 7 are provided on both ends of a grooved wheel connecting tube 155; between the H-disc 16 and the front end cover 2 of transmission, the inner end of the grooved wheel connecting tube 155 extends into the internal spline ring 118, and a circlip 28 for shaft is provided on the end of the grooved wheel connecting tube 155. The grooved wheel connecting tube 155 extends outwards through the solid lubricant embedded bearing 20 and oil seal 1 in the front end cover 2 of transmission. A circlip 28 for shaft is provided above the solid lubricant embedded bearing 20 in the front end cover 2 of transmission on the outer edge of the grooved wheel connecting tube 155. An internal spline 57 of the grooved wheel 139 is fitted over the outer edges of an external spline 7 on the grooved wheel connecting tube 155, a circlip 28 for shaft is provided on the outer end of the grooved wheel connecting tube 155, and a rabbet 72 is arranged between the grooved wheel connecting tube 155 and the front end cover of motor 55. The input shaft 6 and the motor shaft 56 are formed integrally, an external spline 7 is provided on the end of the input shaft 6, the input shaft 6 extends through the grooved wheel connecting tube 155 into an internal spline 57 in the extension bushing 116 of the driving gear 25, and an O-oil seal 137 is provided on the outer edge of the input shaft 6 in the grooved wheel connecting tube 155. Screw threads 94 are arranged on two flexible wire terminals 148 of the flexible wire 149, screw threads 94 are arranged in the hole of the circumferential wall of the front end cover 2 of transmission, oil thread studs 150 are provided on two terminals of the oil threads 147, and the oil thread studs 150 are connected in stud connecting holes 154 arranged in the grooved wheel 139.

Figure 48:
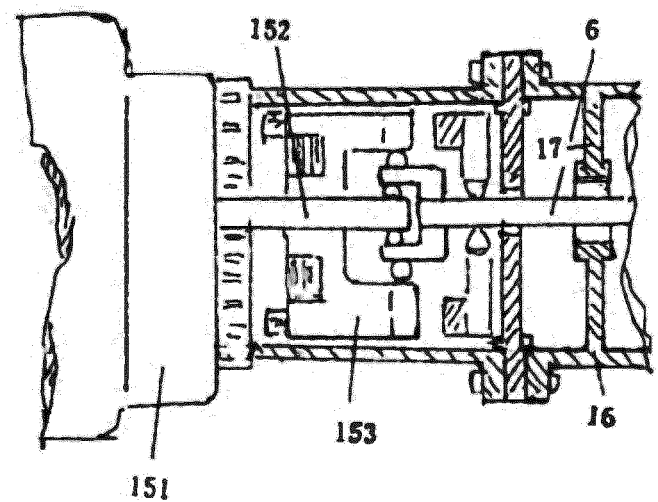
FIG. 48 is a schematic view of the electromagnetic automatic clutch provided between the engine and the transmission according to the fifth embodiment.
Figure 50:
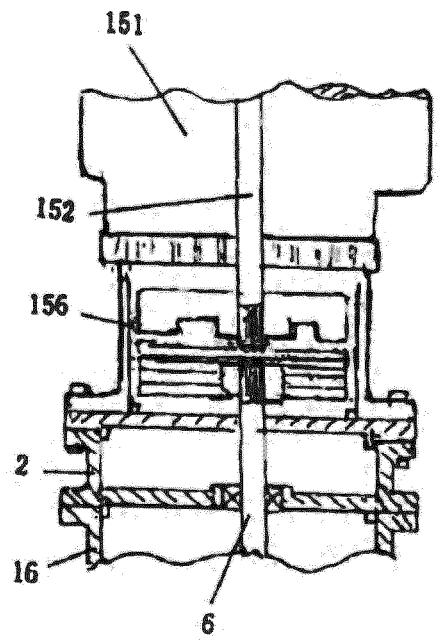
FIG. 50 is a schematic view of the mechanical automatic clutch provided between the engine and the transmission according to the fifth embodiment.

FIGS. 48 and 50 are schematic diagrams of the connection between the cylindrical transmission in this embodiment and a fuel engine, wherein, an electromagnetic automatic clutch 153 is provided between the fuel engine 151 and the cylindrical transmission; an engine output shaft 152 of the fuel engine 151 is inserted into the electromagnetic automatic clutch 153 from one side, and an input shaft 6 of the cylindrical transmission is inserted into the electromagnetic automatic clutch 153 from the other side; a mechanical automatic clutch 156 is provided between the fuel engine 151 and the cylindrical transmission; an engine output shaft 152 of the fuel engine 151 is inserted into the mechanical automatic clutch 156 from one side, and an input shaft 6 of the cylindrical transmission is inserted into the mechanical automatic clutch 156 from the other side.

FIG. 51 is a structural view of a control actuator provided above the center of the front end cover of transmission in this embodiment, wherein, the front end cover 2 of transmission is connected to the H-disc 16, an extension bushing 116 is provided on the driving gear 25, and an internal spline 57 is provided in the extension bushing 116. The extension bushing 116 extends through the solid lubricant embedded bearing 20 in the H-disc 16, and a circlip 28 for shaft is provided on the end of the extension bushing 116. The control actuator 112 is fixed to the outer side of the center of the front end cover 2 of transmission, a control actuator driving shaft tube 117 in the control actuator 112 extends through the oil seal 1 and the solid lubricant embedded bearing 20 in the front end cover 2 of transmission. Between the front end cover 2 of transmission and the H-disc 16, the gear press plate 10 is fixed to one side of an internal spline ring 118, an internal spline 57 in the internal spline ring 118 is fitted over the outer edges of an external spline 7 provided on the control actuator driving shaft tube 117, and a circlip 28 for shaft is provided on the end of the control actuator driving shaft tube. The input shaft 6 extends through the control actuator driving shaft tube 117 in the control actuator 112 and into the extension bushing 116 of the driving gear 25. An O-oil seal 137 is provided on the outer edge of the input shaft 6 in the control actuator driving shaft tube 117.

The objects, technical schemes, and beneficial effects of the present invention are described in detail with reference to the above mentioned embodiments. It should be understood that foregoing description is intended only as a specific embodiment of the invention and is not intended to limit of the invention. Any modification, equivalent replacement, improvement and the like within the spirit and principles of the invention are intended to be included within the scope of the present invention.

The invention claimed is:

1. A cylindrical transmission, comprising a housing, an input shaft, and an output shaft, wherein, the housing comprises several circular discs with outside lips provided thereon, the input shaft and the output shaft are provided on center lines of the several circular discs, several driving gears are provided on the input shaft, a rotary disc is provided on the output shaft, and the rotary disc is provided with internal teeth of rotary disc; several gear shafts are provided between two adjacent circular discs, the gear shafts are provided on the periphery of the driving gears between the two adjacent circular discs, and several gears are provided on each of the gear shaft; the gears are adjacent to the rotary disc, and one of the several gears is disengaged from or engaged with the internal teeth of rotary disc; all the circular discs are connected with each other via the outside lips, wherein the several circular discs include a H-disc, a fixed disc, and a rear end cover of transmission; the fixed disc has a fixed disc side opening; the gear shafts include a transmission gear shaft, and the gear shafts include a transmission gear upper wheel and a transmission gear bottom wheel; the several driving gears are fixed to the input shaft between the H-disc and the fixed disc, and an internal flat surface of fixed disc is arranged below the internal teeth of rotary disc; one side of the H-disc is connected to the fixed disc and the rear end cover of transmission; a bearing and an oil seal are provided at the center of the H-disc; two bearings are provided at the center of the fixed disc; one end of the input shaft extends into the bearings at the center of the fixed disc, and the other end of the input shaft extends through the bearing and oil seal at the enter of an H-disc; several corresponding bearing sockets are provided on the internal flat surface of H-disc and the internal flat surface of fixed disc and bearings are provided in the bearing sockets, both ends of the transmission gear shaft are inserted into the bearings in the bearing sockets respectively; the transmission gear upper wheel is fixed to the transmission gear shaft, and the transmission gear bottom wheel is cup jointed with the transmission gear shaft via splines; the several driving gears are engaged with the transmission gear upper wheels respectively; a compression spring is provided below the transmission bottom wheel; the transmission gear bottom wheel is adjacent to the internal teeth of rotary disc, with clearance between them; the transmission gear bottom wheel is disengaged from or engaged with the internal teeth of rotary disc; the rear end cover of transmission is arranged at the outer side of the rotary disc, wherein several self-retaining electromagnets, electromagnet bases, and electromagnet connectors are provided on the internal flat surface of the H-disc; the self-retaining electromagnets are fixed to the electromagnet bases; an electromagnet push-pull rod is provided in each self-retaining electromagnets the electromagnet push-pull rod extends through an oil seal on the electromagnet base and is connected to the electromagnet connector; a shaft hole and an ejector pin are provided in the transmission gear shaft; a copper washer, a circlip for shaft, and steel balls are provided on the top end of the ejector pin and the lower end of the ejector pin extends into the shaft hole; a bayonet is provided on the bottom side of the electromagnet connector, and the bayonet is inserted at the bottom side of the copper washer; a cross flat hole is provided in the transmission sear shaft; and the transmission gear bottom wheel, transmission gear shaft and ejector pin are connected together in the cross flat hole by dovetail screws.

2. The cylindrical transmission according to claim 1, wherein several self-retaining electromagnets are provided on the internal flat surface of the H-disc; a electromagnet push-pull rod is provided in each self-retaining electromagnet; a shaft hole is provided in the transmission gear shaft, and an ejector pin and steel balls are provided in the shaft hole; the electromagnet push-pull rod is inserted into the shaft hole; a cross flat hole is provided in the transmission gear shaft, a pin shaft is provided in the cross flat hole above the transmission gear bottom wheel, and a leaf spring ring is provided below the transmission gear bottom wheel.

3. The cylindrical transmission according to claim 1, wherein the top end of the output shaft extends into the bearing at the center of the fixed disc, and a bearing and an overrunning clutch are provided between the outer edge of the output shaft and the center of the rotary disc; a compression spring and an engagement disc are provided on the output shaft at one side of the overrunning clutch; an output gear is provided on the bottom end of the output shaft; steel balls and ejector pins are provided in the central part of the bottom end of the output shaft; an end cap of oil seal is provided on the rear end cover of transmission, and a self-retaining electromagnet is provided on the end cap of oil seal; the engagement disc is cup jointed with the output shaft via splines; a cross flat hole is provided on the output shaft, and a pin shaft fitted with the cross flat hole is provided on the top end of the engagement disc; the engagement disc is disengaged from or engaged with one side of the center of the rotary disc.

4. The cylindrical transmission according to claim 1, wherein the center of the rotary disc is fixed to the output shaft, the top end of the output shaft extends into the bearing at the center of the fixed disc, an output gear is provided on the bottom end of the output shaft, and the bottom end of the output shaft extends into the bearing on the rear end cover of transmission; an end cap of oil seal is provided on the rear end of the transmission.

5. The cylindrical transmission according to claim 1, wherein the top end of the output shaft extends into the bearing at the center of the fixed disc, and a bearing and an overrunning clutch are provided between the outer edge of the output shaft and the center of the rotary disc; an engagement disc is provided on the output shaft at one side of the overrunning clutch; the engagement disc is cup jointed with the output shaft via splines; the engagement disc is disengaged from or engaged with one side of the center of the rotary disc; the bottom end of the output shaft extends through the bearing and the oil seal on the rear end cover of transmission; an ejector pin stop plate, an ejector pin, and a shifting fork are provided on the inner wall of the rear end cover of transmission, and the shifting fork is inserted to the outer edge of a groove provided on the engagement disc; a compression spring is provided on the outer edge of the ejector pin, and a self-retaining electromagnet is provided on the rear end cover of transmission at the bottom end of the ejector pin; the ejector pin extends through a hole in the rear end cover of transmission and a hole in the ejector pin stop plate.

6. The cylindrical transmission according to claim 1, wherein the gear shafts further include an intermediate gear shaft; the gear further include an intermediate gear upper wheel and an intermediate gear bottom wheel; the driving gears are fixed to the input shaft between the internal flat surface of H-disc and the fixed disc; the driving gears are engaged with the intermediate gear upper wheel or the intermediate gear bottom wheel, and the intermediate gear upper wheel or the intermediate gear bottom wheel is engaged with the transmission gear upper wheel.

7. The cylindrical transmission according to claim 6, wherein the gears further include a reverse gear, the transmission gear bottom wheel and the reverse gear are arranged above the internal teeth of rotary disc; the reverse gear is engaged with the transmission gear bottom wheel; the reverse gear is fixed to the internal flat surface of fixed disc via a reverse gear shaft; a compression spring is provided on the outer edge of the reverse gear shaft, and a plain washer and a circlip for shaft are provided on the top end of the reverse gear shaft; a seesaw is provided below the compression spring; an outer flange copper bushing is provided at the center of the reverse gear, and a solid lubricant embedded bearing is provided on the reverse gear shaft; a gear shift control device is provided at one side of the reverse gear, and the gear shift control device comprises a shifting fork lever and a first shifting fork; the shifting fork lever is arranged between the internal flat surface of the H-disc and the internal flat surface of fixed disc, and extends through the internal flat surface of the H-disc; the first shifting fork is fixed to the shifting fork lever and inserted to the outer edge of a groove arranged in the top end of the reverse gear, and the reverse gear is disengaged from or engaged with the internal teeth of rotary disc.

8. The cylindrical transmission according to claim 7, wherein a synchronizer is provided between two adjacent transmission gear upper wheels, and the synchronizer is cup jointed with the transmission gear shaft via a spline; internal teeth to be engaged are provided on the synchronizer, and external teeth to be engaged matching with the internal teeth to be engaged are provided on the transmission gear upper wheel; the transmission gear bottom wheel is fixed to the transmission gear shaft and engaged with the internal teeth of rotary disc; needle roller bearings are provided between the several transmission gear upper wheels and the transmission gear shafts; the gear shift control device further comprises a second shifting fork inserted to the outer edge of a groove in the synchronizer on the transmission gear shaft.

9. The cylindrical transmission according to claim 1, wherein each gear shaft includes a transmission single gear, the internal flat surface of the H-disc and the fixed flat disc have several fixed columns, several bearing sockets corresponding to the fixed columns are provided on the internal flat surface of the H-disc and the fixed flat disc, and solid lubricant embedded bearings are provided in the bearing sockets; between the H-disc and the fixed flat disc, the driving gears are arranged on the outer edge of the input shaft, the transmission gear upper wheel and the transmission gear bottom wheel are fixed to the transmission gear shaft, and steel balls are provided in the top end of the transmission gear shaft; the transmission gear shaft extends upward through the internal flat surface of the H-disc; a compression spring is provided below the transmission gear bottom wheel; the bottom of the transmission gear shaft extends into an outer flange copper bushing in the fixed flat disc, the outer flange copper bushing is arranged in the solid lubricant embedded bearing in the fixed flat disc, and the fixed flat disc is arranged below the internal teeth of rotary disc; the driving gear is engaged with the transmission gear upper wheel, the transmission gear bottom wheel is adjacent to the internal teeth of rotary disc, with clearance arranged between them, and the transmission gear bottom wheel is disengaged from or engaged with the internal teeth of rotary disc; an outside lip of the H-disc is connected to an outside lip of the rear end cover of transmission; the center of the rotary disc is fixed to the output shaft, one end of the output shaft extends into the bearing at the center of the fixed flat disc, and the other end of the output shaft extends through the bearing and the oil seal in the rear end cover of transmission.

10. The cylindrical transmission according to claim 9, wherein the outer end of the output shaft extends through the rear end cover of transmission and an overrunning clutch at the center of a hub disc; a nut and a thrust gasket are provided on the outer end of the output shaft; a bearing is provided between the center of the hub disc and the outer edge of one side of the rear end cover of transmission.

11. The cylindrical transmission according to claim 1, wherein the several circular discs include a front end cover of transmission, and solid lubricant embedded bearings are provided in the bearing sockets; the gear shafts include an intermediate gear shaft and a transmission gear shaft; the gear includes an intermediate gear upper wheel, an intermediate gear bottom wheel, a transmission gear upper wheel, and a transmission gear bottom wheel; the driving gears are fixed to the input shaft between the internal flat surface of the H-disc and the fixed flat disc; two bearings are provided at the center of the fixed flat disc; one end of the input shaft extends into one bearing at the center of the fixed flat disc; the other end of the input shaft extends through the bearing at the center of the H-disc and the oil seal at the center of the front end cover of transmission sequentially; the center of the rotary disc is fixed to the output shaft, one end of the output shaft extends into the other bearing at the center of the fixed flat disc, and the other end of the output shaft extends through the bearing and the oil seal in the rear end cover of transmission; the intermediate gear upper wheel and the intermediate gear bottom wheel are fixed to the intermediate gear shaft, and the transmission gear upper wheel and the transmission gear bottom wheel are fixed to the transmission gear shaft; the driving gears are engaged with the intermediate gear upper wheel or the intermediate gear bottom wheel, and the intermediate gear upper wheel or the intermediate gear bottom wheel is engaged with the transmission gear upper wheel; steel balls are provided in the top end of the transmission gear shaft; the top end of the transmission gear shaft extends through the solid lubricant embedded bearing in the internal flat surface of the H-disc and is arranged below the front end cover of transmission; a compression spring is provided on the outer edge of the bottom end of the transmission gear shaft, the bottom end of the transmission gear shaft extends into an outer flange copper bushing in the fixed flat disc, and the outer flange copper bushing is arranged in the solid lubricant embedded bearing in the fixed flat disc; several fixed columns are provided between the H-disc and the fixed flat disc.

12. The cylindrical transmission according to claim 11, wherein the gears further include an intermediate single gear; the intermediate single gear is arranged between the internal flat surface of the H-disc and the fixed flat disc; the driving gear is engaged with the intermediate single gear, the intermediate single gear is engaged with the transmission gear upper wheel, and the transmission gear bottom wheel is disengaged from or engaged with the internal teeth of rotary disc.

13. The cylindrical transmission according to claim 11, wherein the gears further include a transmission single gear, the transmission single gear is arranged between the internal flat surface of the H-disc and the fixed flat disc; the intermediate gear upper wheel or the intermediate gear bottom wheel is engaged with the transmission single gear; the transmission single gear is disengaged from or engaged with the internal teeth of rotary disc.

14. The cylindrical transmission according to claim 1, wherein the several circular discs include a front end cover of transmission, the H-disc, and the fixed flat disc are fitted over the outer edge of the input shaft; solid lubricant embedded bearings are provided at the center of the input shaft and the output shaft; a connecting ring is provided on the outer end of the input shaft, a chain wheel is provided on the outer edge of the connecting ring, and solid lubricant embedded bearings are provided between the H-disc and the input shaft and between the fixed flat disc and the input shaft respectively; an O-oil seal is provided between the front end cover of transmission and the input shaft; the rotary disc and the output shaft are formed into an integral structure; the outer end of the output shaft extends through the rear end cover of transmission, and a solid lubricant embedded bearing and an O-oil seal are provided between the rear end cover of transmission and the output shaft; a hub disc is provided on the outer edge of the output shaft; one side of the H-disc is connected to the front end cover of transmission, and the other side of the H-disc is connected to the rear end cover of transmission; several fixed columns are provided between the H-disc and the fixed flat disc.

15. The cylindrical transmission according to claim 14, wherein a shift gear bushing, an outer shift gear, an outer shift gear shaft, a gear press plate, and a grooved wheel are provided between the front end cover of transmission and the internal flat surface of the H-disc; the gear press plate is fixed to the shift gear bushing, and the gear press plate has a bevel; the shift gear bushing is arranged on the outer edge of the input shaft, and the shift gear bushing is engaged with the outer shift gear, the outer shift gear is fixed to the outer shift gear shaft, and the outer shift gear shaft extends out of the front end cover of transmission; the grooved wheel is fixed to one end of the outer shift gear shaft.

16. The cylindrical transmission according to claim 15, wherein several corresponding bearing sockets are provided on the internal flat surface of the H-disc and the fixed flat disc, and solid lubricant embedded bearings are provided in the bearing sockets; the gear shafts include an intermediate gear shaft and a transmission gear shaft; the gears include an intermediate gear upper wheel, an intermediate gear bottom wheel, a transmission gear upper wheel, and a transmission gear bottom wheel; the driving gears are fixed to the input shaft between the internal flat surface of the H-disc and the fixed flat disc; the center of the rotary disc is fixed to the output shaft; the intermediate gear upper wheel and the intermediate gear bottom wheel are fixed to the intermediate gear shaft, and the transmission gear upper wheel and the transmission gear bottom wheel are fixed to the transmission gear shaft; the driving gears are engaged with the intermediate gear upper wheel or the intermediate gear bottom wheel, and the intermediate gear upper wheel or the intermediate gear bottom wheel is engaged with the transmission gear upper wheel; steel balls are provided in the top end of the transmission gear shaft; the top end of the transmission gear shaft extends through the solid lubricant embedded bearing in the internal flat surface of H-disc and is arranged below the front end cover of transmission; a compression spring is provided on the outer edge of the bottom end of the transmission gear shaft, the bottom end of the transmission gear shaft extends into an outer flange copper bushing in the fixed flat disc, and the outer flange copper bushing is arranged in the solid lubricant embedded bearing in the fixed flat disc.

17. The cylindrical transmission according to claim 1, wherein one end of the output shaft extends into the bearing at the center of the fixed disc, and the other end of the output shaft extends through the bearing and the oil seal in the rear end cover of transmission; the center of the rotary disc is fixed to the output shaft.

18. The cylindrical transmission according to claim 1, wherein an extension bushing is provided on the driving gear, and an internal spline is provided in the extension bushing; the extension bushing extends through the solid lubricant embedded bearing at the center of the H-disc, and a circlip for shaft is provided on the end of the extension bushing; an external spline is provided on the end of the input shaft; the input shaft extends through a driving shaft tube of an external driving device, and then extends into the extension bushing at the center of the H-disc.

19. The cylindrical transmission according to claim 1, wherein a first groove is provided in the inner circle of the driving gear, a first cross flat hole is provided in the input shaft in the inner circle of the driving gear, and a first shift plate is provided in the first cross flat hole; the first groove is fitted into the outer edge of the first shift plate, and a first plain washer and a first circlip for shaft are provided on the upper side of the driving gear, a second groove is provided in the inner circle of the transmission gear upper wheel, a second cross flat hole is provided in the transmission gear shaft in the inner circle of the transmission gear upper wheel, and a second shift plate is provided in the second cross flat hole; the second groove is fitted into the outer edge of the second shift plate, and a second plain washer and a second circlip for shaft are provided on the upper side of the transmission gear upper wheel; a third groove is provided in the inner circle of the transmission gear bottom wheel, a third cross flat hole is provided in the transmission gear shaft at the center of the inner circle of the transmission gear bottom wheel, and a third shift plate is provided in the third cross flat hole; the third groove is fitted into the outer edge of the third shift plate, and a third plain washer and a third circlip for shaft are provided on the lower side of the transmission gear bottom wheel; a fourth groove is provided in the inner circle at the center of the rotary disc, a fourth cross flat hole is provided in the output shaft fitted at the center of the rotary disc, and a fourth shift plate is provided in the fourth cross flat hole; the fourth groove is fitted into the outer edge of the fourth shift plate, and a fourth plain washer and a fourth circlip for shaft are provided on the inner side of the rotary disc on the output shaft.

20. The cylindrical transmission according to claim 1, wherein a first groove is provided in the inner circle of the driving gear, a first cross flat hole is provided in the input shaft in the inner circle of the driving gear, and a first shift plate is provided in the first cross flat hole; the first groove is fitted into the outer edge of the first shift plate, and a first plain washer and a first circlip for shaft are provided on the upper side of the driving gear; a second groove is provided in the inner circle of the transmission gear upper wheel, two opposite fourth shift plates are provided on the transmission gear shaft at the center of the inner circle of the transmission gear upper wheel, and the second groove is fitted into the outer edges of the two fourth shift plates; a second plain washer and a second circlip for shaft are provided on the upper side of the transmission gear upper wheel; a fourth groove is provided in the inner circle at the center of the rotary disc, a fourth cross flat hole is provided in the output shaft fitted in the center of the rotary disc, and a fourth shift plate is provided in the fourth cross flat hole; the fourth groove is fitted into the outer edge of the fourth shift plate, and a fourth plain washer and a fourth circlip for shaft are provided on the inner side of the rotary disc on the output shaft.

21. A cylindrical transmission, comprising a housing, an input shaft, and an output shaft, wherein, the housing comprises several circular discs with outside lips provided thereon, the input shaft and the output shaft are provided on center lines of the several circular discs, several driving gears are provided on the input shaft, a rotary disc is provided on the output shaft, and the rotary disc is provided with internal teeth of rotary disc; several gear shafts are provided between two adjacent circular discs, the gear shafts are provided on the periphery of the driving ears between the two adjacent circular discs, and several gears art provided on each of the gear shaft; gears are adjacent to the rotary disc, and one of the several gears is disengaged from or engaged with the internal teeth of rotary disc; all the circular discs are connected with each other via the outside lips, and wherein the several circular discs include a front end cover of transmission, an H-disc, a fixed disc, and a rear housing of transmission; the rear housing of transmission forms an integral structure with a differential case; the two adjacent circular discs are the H-disc and the fixed disc, the fixed disc has a fixed disc side opening, and the internal flat surface of fixed disc is arranged below the internal teeth of rotary disc; the gear shafts include a transmission gear shaft; the gear includes a transmission gear upper wheel and a transmission gear bottom wheel, or the gear is a transmission single gear; one end of the input shaft extends into the bearing and the oil seal at the center of the front end cover of transmission, and the other end of the input shaft extends through the bearing at the center of the H-disc; the driving gears are fixed to the end of the input shaft between the H-disc and the fixed disc; several corresponding bearing sockets are provided on the internal flat surface of H-disc and the internal flat surface of fixed disc, and solid lubricant embedded bearings are provided in the bearing sockets; the transmission gear upper wheel and the transmission gear bottom wheel are fixed to the transmission gear shaft between the H-disc and the fixed disc; the transmission gear shaft is arranged below the front end cover of transmission, and steel balls are provided in the central part of the top end of the transmission gear shaft; the top end of the transmission gear shaft extends through the solid lubricant embedded bearing in the internal flat surface of the H-disc, the bottom end of the transmission gear shaft extends into the solid lubricant embedded bearing in the internal flat surface of fixed disc, a leaf spring ring is provided on the bottom surface of the internal flat surface of fixed disc, and steel balls and studs are provided in the central part of the bottom end of the transmission gear shaft; the transmission gear bottom wheel and the internal teeth of rotary disc are adjacent to each other, with clearance between them; the driving gears are engaged with the transmission gear upper wheel; the transmission gear bottom wheel is disengaged from or engaged with the internal teeth of rotary disc; one side of the H-disc is connected to the front end cover of transmission, and the other side of the H-disc is connected to the fixed disc and the rear housing of transmission.

22. The cylindrical transmission according to claim 21, wherein the top end of the output shaft extends into the bearing at the center of the fixed disc, and a bearing and an overrunning clutch are provided between the outer edge of the output shaft and the center of the rotary disc; a compression spring and an engagement disc are provided on the output shaft at one side of the overrunning clutch; an output gear is provided on the bottom end of the output shaft, and the output gear is arranged in the differential case and engaged with an idle gear and a driven gear in the differential case sequentially; the bottom end of the output shaft extends into the bearing on the outer side surface of differential; a self-retaining electromagnet and an end cap of oil seal are provided on the outer side surface of differential, a electromagnet push-pull rod is provided in the self-retaining electromagnet, and the self-retaining electromagnet is arranged on the bottom end of the output shaft; a cross flat hole and a key are provided on the output shaft, and the engagement disc is cup jointed with the output shaft via the key; steel balls and ejector pins are provided in the central part of the bottom end of the output shaft; a pin shaft fitted with the cross flat hole is provided on the top end of the engagement disc; the inner circle side of the rotary disc is disengaged from or engaged with the engagement disc; bearings are provided between the both ends of the idle gear shaft and the inner side surface of differential and outer side surface of differential.

23. The cylindrical transmission according to claim 21, wherein the center of the rotary disc is fixed to the output shaft, and the top end of the output shaft extends into the bearing at the center of the fixed disc; an output gear is provided on the bottom end of the output shaft, and the output gear is arranged in the differential case and engaged with an idle gear and a driven gear in the differential case sequentially; the bottom end of the output shaft extends into the bearing on the outer side surface of differential; an end cap of oil seal is provided on the outer side surface of differential; bearings are provided between the both ends of the idle gear shaft and the inner side surface of differential and outer side surface of differential.

24. The cylindrical transmission according to claim 21, wherein a shift gear bushing, a duplex intermediate shift wheel, an outer shift gear, an outer shift gear shaft, a gear press plate, and a gear pull plate are provided between the front end cover of transmission and the internal flat surface of the H-disc; the gear press plate is fixed to the shift gear bushing, and the gear press plate has a bevel; the shift gear bushing is arranged on the outer edge of the input shaft, and the duplex intermediate shift wheel is engaged with the shift gear bushing and the outer shift gear respectively; the outer shift gear is fixed to the outer shift gear shaft, and the outer shift gear shaft extends out of the front end cover of transmission; the gear pull plate is fixed to one end of the outer shift gear shaft.

25. The cylindrical transmission according to claim 21, wherein steel balls are provided in the top end of the transmission gear shaft, and a copper washer and a circlip for shaft are provided on the top part of the transmission gear shaft; the transmission gear shaft extends upward through the internal flat surface of the H-disc; several leaf springs and screw rods are provided on the internal flat surface of the H-disc; the leaf springs are fixed to the internal flat surface of H-disc via the screw rod; the leaf springs are arranged below the copper washer.

26. The cylindrical transmission according to claim 21, wherein a shift gear bushing, a shift intermediate single gear, an outer shift gear, an outer shift gear shaft, and a gear press plate are provided between the front end cover of transmission and the internal flat surface of the H-disc; the gear press plate is fixed to the shift gear bushing, and the gear press plate has a bevel; the shift gear bushing is arranged on the outer edge of the input shaft, and the shift intermediate single gear is engaged with the shift gear bushing and the outer shift gear respectively; the outer shift gear is fixed to the outer shift gear shaft, and the outer shift gear shaft extends out of the front end cover of transmission.

27. The cylindrical transmission according to claim 21, wherein each gear shafts further includes an intermediate gear shaft; each gear shaft further includes an intermediate gear upper wheel and an intermediate gear bottom wheel; the driving gears are fixed to the input shaft between the internal flat surface of the H-disc and the fixed disc; the driving gears are engaged with the intermediate gear upper wheel or the intermediate gear bottom wheel, and the intermediate gear upper wheel or the intermediate gear bottom wheel is engaged with the transmission gear upper wheel.

28. The cylindrical transmission according to claim 27, wherein the gears further include a reverse gear, the transmission gear bottom wheel and the reverse gear are arranged above the internal teeth of rotary disc; the reverse gear is engaged with the transmission gear bottom wheel; the reverse gear is fixed to the internal flat surface of fixed disc via a reverse gear shaft; a compression spring is provided on the outer edge of the reverse gear shaft, and a plain washer and a circlip for shaft are provided on the top end of the reverse gear shaft; a seesaw is provided below the compression spring; an outer flange copper bushing is provided at the center of the reverse gear, and a solid lubricant embedded bearing is provided on the reverse gear shaft; a gear shift control device is provided at one side of the reverse gear, and the gear shift control device comprises a shifting fork lever and a first shifting fork; the shifting fork lever is arranged between the internal flat surface of the H-disc and the internal flat surface of fixed disc, and extends through the internal flat surface of the H-disc; the first shifting fork is fixed to the shifting fork lever and inserted to the outer edge of a groove arranged in the top end of the reverse gear, and the reverse gear is disengaged from or engaged with the internal teeth of rotary disc.

* * * * *